United States Patent
Li et al.

(10) Patent No.: US 12,294,933 B2
(45) Date of Patent: May 6, 2025

(54) NETWORK ACCESS METHOD AND APPARATUS

(71) Applicant: Huawei Technologies Co., Ltd., Shenzhen (CN)

(72) Inventors: Huan Li, Shenzhen (CN); Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 448 days.

(21) Appl. No.: 17/741,216

(22) Filed: May 10, 2022

(65) Prior Publication Data

US 2022/0272608 A1 Aug. 25, 2022

Related U.S. Application Data

(63) Continuation of application No. PCT/CN2019/117596, filed on Nov. 12, 2019.

(51) Int. Cl.
*H04W 56/00* (2009.01)
*H04W 8/20* (2009.01)
(Continued)

(52) U.S. Cl.
CPC ............. *H04W 48/04* (2013.01); *H04W 8/20* (2013.01); *H04W 48/16* (2013.01)

(58) Field of Classification Search
CPC ........ H04W 48/04; H04W 8/20; H04W 48/16
(Continued)

(56) References Cited

U.S. PATENT DOCUMENTS

2011/0314522 A1* 12/2011 Palanigounder ....... H04B 7/155
726/4
2019/0174449 A1* 6/2019 Shan ..................... H04W 60/04
(Continued)

FOREIGN PATENT DOCUMENTS

CN 101115283 A 1/2008
CN 102457938 A 5/2012
(Continued)

OTHER PUBLICATIONS

"Edge et al., Low Power Periodic and Triggered Positioning of Mobile Devices Using Early Data Transmission, Feb. 2, 2021, CN 11234021" (Year: 2019).*
(Continued)

*Primary Examiner* — Sai Ming Chan
(74) *Attorney, Agent, or Firm* — Leydig, Voit & Mayer, Ltd.

(57) ABSTRACT

A network access method and apparatus for improving network access accuracy of a terminal device are disclosed. A first network element (for example, an access management network element (for example, access and mobility management function (AMF) network element or a mobility management entity (MME) network element) or a unified data management (UDM) network element) obtains an access request including access location information of a first terminal device; obtains subscription information including subscription location information of the first terminal device; in response to confirming that the access location information of the first terminal device does not belong to the subscription location information, obtains permission information for permitting the first terminal device to access a network at an access location corresponding to the access location information; and permits, based on the permission message, the first terminal device to access
(Continued)

the network at the access location corresponding to the access location information.

18 Claims, 11 Drawing Sheets

(51) Int. Cl.
    *H04W 48/04*     (2009.01)
    *H04W 48/16*     (2009.01)

(58) Field of Classification Search
    USPC .......................................................... 370/329
    See application file for complete search history.

(56) References Cited

U.S. PATENT DOCUMENTS

| | | | |
|---|---|---|---|
| 2020/0053638 A1* | 2/2020 | Edge | H04W 88/14 |
| 2020/0359192 A1* | 11/2020 | Lim | H04N 1/36 |
| 2021/0136571 A1* | 5/2021 | Ke | H04W 4/029 |
| 2021/0168584 A1* | 6/2021 | Li | H04W 60/00 |
| 2021/0306855 A1* | 9/2021 | You | H04W 12/72 |
| 2022/0141662 A1* | 5/2022 | Liao | H04W 12/37 |
| | | | 726/1 |
| 2022/0255906 A1* | 8/2022 | Kim | H04L 63/0428 |

FOREIGN PATENT DOCUMENTS

| | | |
|---|---|---|
| CN | 105578526 A | 5/2016 |
| CN | 106535112 A | 3/2017 |
| CN | 106664564 A | 5/2017 |
| CN | 108174433 A | 6/2018 |
| CN | 108810941 A | 11/2018 |
| EP | 3197195 A1 | 7/2017 |
| EP | 3471464 A1 | 4/2019 |
| WO | 2011020401 A1 | 2/2011 |
| WO | 2012051890 A1 | 4/2012 |
| WO | 2017031726 A1 | 3/2017 |
| WO | 2018090658 A1 | 5/2018 |

OTHER PUBLICATIONS

"Kim et al., Methods for Supporting and Providing Ladn Service in Wireless Communication System and Apparatus Therefor, Aug. 7, 2024, EP 3703399" (Year: 2018).*

"Li et al., A Method, Device And System For Actualizing Terminal Access, Mar. 22, 2017, CN 106535112" (Year: 2015).*

Huawei et al., "Clarification on the misalignment of service area restriction between UE and Network," 3GPP TSG-SA WG2 Meeting #134, Jun. 24-28, 2019, Sapporo, Japan, S2-1907008, XP051750707, Total 4 pages, 3rd Generation Partnership Project, Valbonne, France (Jun. 17, 2019).

Samsung et al., "Mobility Restriction Update Procedure," SA WG2 Meeting #119, S2-171479, XP051234501, Total 2 pages, 3rd Generation Partnership Project, Valbonne, France (Feb. 13-17, 2017).

Huawei et al., "Update of Registration Restriction solution and interim conclusion," SA WG2 Meeting #129, 3GPP Draft, S2-1810714, XP051539665, Total 6 pages, 3rd Generation Partnership Project, Valbonne, France (Oct. 15-19, 2018).

"3rd Generation Partnership Project; Technical Specification Group Services and System Aspects; Procedures for the 5G System; Stage 2 (Release 16)," 3GPP TS 23.502, V16.2.0, XP051839501, Total 524 pages, 3rd Generation Partnership Project, Valbonne, France (Sep. 24, 2019).

"Support of location information for UE behind 5G-RG via W-5GAN using trusted Non-3GPP access," 3GPP TSG-SA2 Meeting #135, Split, Croatia, S2-1909471, Total 3 pages, 3rd Generation Partnership Project, Valbonne, France (Oct. 14-18, 2019).

\* cited by examiner

NETWORK ACCESS METHOD AND APPARATUS

CROSS-REFERENCE TO RELATED APPLICATIONS

This application is a continuation of International Application No. PCT/CN2019/117596, filed on Nov. 12, 2019, the disclosure of which is hereby incorporated by reference in its entirety.

TECHNICAL FIELD

This application relates to the field of communication technologies, and in particular, to a network access method and an apparatus.

BACKGROUND

With rapid development of a 5th generation mobile communication system (5th generation wireless system, 5G), types of terminal devices are also increasing. In addition to common mobile phones and tablet computers, terminal devices may further include internet of things (IoT) devices, 5G-residential gateways for home broadband access, and the like.

Generally, each terminal device performs network access based on subscription information corresponding to the terminal device. The subscription information is configured by an operator, and records information including subscription location information identifying a location at which the terminal device is permitted to access a network, and the like. In other words, each terminal device can access a network only at a location permitted by subscription location information corresponding to the terminal device; otherwise, a network access failure occurs. For example, when the terminal device needs to access the network at a specific location, if a location area, in the subscription location information corresponding to the terminal device, in which the terminal device is permitted to access the network includes the location, it indicates that the terminal device can access the network at the location; or if a location area, in the subscription location information corresponding to the terminal device, in which the terminal device is permitted to access the network does not include the location, it indicates that the terminal device cannot access the network at the location.

Therefore, when a location of the terminal device changes, and consequently the location of the terminal device is not within the location area, in the subscription location information, in which the terminal device is permitted to access the network, a network access failure of the terminal device occurs. Therefore, how to improve network access accuracy of the terminal device when the location of the terminal device changes is a technical problem that currently needs to be resolved.

SUMMARY

To resolve the foregoing problem, embodiments of this application provide a network access method and an apparatus, to improve network access accuracy of a terminal device.

According to a first aspect, this application provides a network access method. The method includes: During network access, a first network element first obtains an access request that includes access location information of a first terminal device. The first network element may be an access management network element or a unified data management (UDM) network element, and the access management network element may be a key control node (mobility management entity, MME) network element of a long term evolution (LTE) access network of a 3rd generation partnership project (3GPP) protocol universal mobile communication technology or an access and mobility management function (AMF) network element. For example, an AMF network element in FIG. 2 may obtain an access request that is input by a 5G-residential gateway (5G-RG) through a fixed network, or an AMF network element in FIG. 3 may obtain an access request that is input by a 5G-RG through a wireless network. Then, the first network element may obtain subscription information that includes subscription location information of the first terminal device. Next, when the first network element confirms that the access location information of the first terminal device does not belong to the subscription location information, the first network element may obtain permission information for permitting the first terminal device to access a network at an access location corresponding to the access location information, and may further permit, based on the permission message, the first terminal device to access the network at the access location corresponding to the access location information.

Compared with a conventional technology, in this embodiment of this application, the first network element is used to: first determine whether the access location information of the first terminal device belongs to the subscription location information; and when determining that the access location information does not belong to the subscription location information, permit, based on the obtained permission information, the first terminal device to access the network at the access location corresponding to the access location information, without consuming long time, thereby improving network access accuracy of the terminal device.

In a possible implementation, the access request further includes an identifier of the first terminal device; and that the first network element obtains subscription information of the first terminal device includes: The first network element obtains the subscription information of the first terminal device based on the identifier of the first terminal device. In this way, accuracy of obtaining the subscription information can be improved.

In a possible implementation, the first network element is an access management network element, and that the first network element obtains subscription information of the first terminal device includes: The access management network element sends an information obtaining request to a unified data management (UDM) network element, where the information obtaining request includes the identifier of the first terminal device; and the access management network element receives the subscription information sent by the UDM network element based on the identifier of the first terminal device. The UDM network element is responsible for managing the subscription information of the terminal device. In this way, the subscription information of the first terminal device that is obtained by the UDM network element based on the identifier of the first terminal device is more accurate, and an obtaining speed is faster.

In a possible implementation, that the first network element obtains permission information includes: The first network element sends a confirmation request to a network exposure function (NEF) network element, where the confirmation request includes the access location information of the first terminal device; and the first network element receives the permission information that is obtained by the NEF network element based on the access location information of the first terminal device. In this way, the NEF network element quickly finds, based on the access location information of the first terminal device, the terminal device that can obtain the permission information, thereby improving a rate and accuracy of obtaining the permission information by the NEF network element, and further improving a rate and accuracy of obtaining the permission information by the first network element.

In a possible implementation, the subscription information further includes information about the terminal device, and the confirmation request further carries the information about the terminal device.

In a possible implementation, the information about the terminal device includes one or more of the following: an identifier of a second terminal device, a mailbox, and an account name of social software.

In a possible implementation, the confirmation request further includes the subscription location information and/or the identifier of the first terminal device.

In a possible implementation, that the first network element obtains permission information includes: The first network element obtains a first parameter when the subscription information includes the first parameter, where the first parameter is used to indicate that the first terminal device is permitted to access the network at the access location corresponding to the access location information when the access location information of the first terminal device does not belong to the subscription location information. In this way, network access of the first terminal device can be quickly and conveniently implemented based on content of the first parameter.

In a possible implementation, the first network element is an access management network element, and that the first network element obtains permission information includes: The access management network element sends a confirmation request to a UDM network element, where the confirmation request includes the access location information of the first terminal device; and the access management network element receives the permission information sent by the UDM network element based on the access location information of the first terminal device. In this way, the UDM network element quickly finds, based on the access location information of the first terminal device, the terminal device that can obtain the permission information, thereby improving a rate and accuracy of obtaining the permission information by the UDM network element, and further improving a rate and accuracy of obtaining the permission information by the first network element.

In a possible implementation, the first network element is an access management network element, and that the first network element obtains permission information includes: The access management network element sends a confirmation request to an NEF network element, where the confirmation request includes the access location information of the first terminal device; and the access management network element receives the permission information from a UDM network element. In this way, the NEF network element quickly finds, based on the access location information of the first terminal device, the terminal device that can obtain the permission information, thereby subsequently improving a rate and accuracy of obtaining the permission information by the UDM network element, and further improving a rate and accuracy of obtaining the permission information by the first network element.

In a possible implementation, the first network element is an access management network element, and after that the first network element obtains permission information, the method further includes: The access management network element sends a subscription information update request to a UDM network element, where the subscription information update request includes the access location information of the first terminal device, and the subscription information update request is used to update the subscription location information based on the access location information of the first terminal device.

In this way, without participation of an operator in setting, the subscription location information can be automatically updated, without consuming long time, thereby improving network access efficiency and convenience of the terminal device.

In a possible implementation, the first network element is a UDM network element, and that the first network element permits, based on the permission information, the first terminal device to access the network at the access location corresponding to the access location information includes: The UDM network element updates the subscription location information based on the access location information of the first terminal device. In this way, the subscription location information can be updated, without consuming long time, thereby improving network access efficiency and convenience of the terminal device.

In a possible implementation, the method further includes: The UDM network element sends an information update message to an access management network element, where the information update message includes the updated subscription location information. In this way, it is convenient for the access management network element to permit, based on the updated subscription location information, the first terminal device to access the network at the access location corresponding to the access location information.

In a possible implementation, that the first network element obtains permission information includes: The first network element obtains the permission information within a preset time period. In this way, time in which the permission message is obtained can be effectively monitored, to determine whether subsequent network access can be performed.

In a possible implementation, the access request includes indication information, and the indication information is used to indicate that the first network element obtains the permission information within the preset time period.

In a possible implementation, when the first network element does not obtain the permission information within the preset time period, the method further includes: The first network element sends timer information to the first terminal device, where the timer information is used to indicate that the first terminal device sends the access request after a timer expires. In this way, waiting time for implementing network access of the first terminal device each time can be reduced, and network access efficiency can be improved.

According to a second aspect, this application further provides an information update method. The method includes: A UDM network element first obtains access location information of a first terminal device and a first indication, where the first indication is used to indicate to update subscription location information of the first terminal device based on the access location information of the first terminal device. Then, after obtaining subscription information that includes the subscription location information of the first terminal device, the UDM network element may update the subscription location information of the first terminal device based on the obtained access location information of the first terminal device and the obtained first indication.

Compared with the conventional technology, in this embodiment of this application, the UDM network element updates the subscription location information of the first terminal device by using the obtained access location information of the first terminal device and the obtained first indication. Therefore, without manual reconfiguration performed by an operator, the subscription location information can be automatically updated, without consuming long update time, thereby improving network access efficiency and convenience of the terminal device.

In a possible implementation, that a UDM network element obtains access location information of a first terminal device includes: The UDM network element obtains geographical location information of the first terminal device; and the UDM network element determines the access location information of the first terminal device based on the geographical location information of the first terminal device. In this way, the access location information of the first terminal device is determined by using the current geographical location information of the first terminal device, so that accuracy is higher.

In a possible implementation, that the UDM network element obtains subscription information of the first terminal device includes: The UDM network element obtains information about the terminal device; and the UDM network element obtains the subscription information of the first terminal device based on the information about the terminal device. The UDM network element is responsible for managing the subscription information of the terminal device. In this way, the subscription information of the first terminal device that is obtained by the UDM network element based on the information about the terminal device is more accurate, and an obtaining speed is faster.

In a possible implementation, the information about the terminal device includes at least one of the following: an identifier of the first terminal device, an identifier of a second terminal device, a mailbox, and an account of social software.

In a possible implementation, after that the UDM network element updates the subscription location information of the first terminal device based on the access location information of the first terminal device and the first indication, the method further includes: The UDM network element sends an update success message to the first terminal device. In this way, it is convenient to notify the first terminal device that the first terminal device can access a network at an access location corresponding to the access location information.

According to a third aspect, this application further provides an information update method. The method includes: A second terminal device sends a first information update request to an NEF network element, where the first information update request includes geographical location information of a first terminal device and a first indication, and the first indication is used to indicate to update subscription location information of the first terminal device based on the geographical location information of the first terminal device.

Compared with the conventional technology, in this embodiment of this application, the second terminal device sends the information update request that includes the geographical location information of the first terminal device and the first indication to the NEF network element, so that the NEF network element can update the subscription location information of the first terminal device by using the geographical location information of the first terminal device based on the first indication. Therefore, without manual reconfiguration performed by an operator, the subscription location information can be automatically updated, without consuming long update time, thereby improving network access efficiency and convenience of the terminal device.

In a possible implementation, the first information update request further includes information about the terminal device, and the information about the terminal device is used to obtain the subscription location information of the first terminal device.

In a possible implementation, the information about the terminal device includes at least one of the following: an identifier of the first terminal device, an identifier of the second terminal device, a mailbox, and an account of social software.

In a possible implementation, the method further includes: The second terminal device receives an update success message. In this way, it is convenient to notify the first terminal device that the first terminal device can access a network at an access location corresponding to access location information.

In a possible implementation, the first information update request is sent in one or more of the following manners: an SMS message, an email, and social software.

According to a fourth aspect, this application further provides an information update method. The method includes: An NEF network element first receives a first information update request that includes geographical location information of a first terminal device and a first indication, where the first indication is used to indicate to update subscription location information of the first terminal device based on the geographical location information of the first terminal device. Then, the NEF network element determines access location information of the first terminal device based on the geographical location information of the first terminal device. Next, the NEF network element sends, to a UDM network element, a second information update request that includes the access location information of the first terminal device and the first indication, to indicate the UDM network element to update the subscription location information of the first terminal device based on the geographical location information of the first terminal device.

Compared with the conventional technology, in this embodiment of this application, the NEF network element sends the information update request that includes the geographical location information of the first terminal device and the first indication to the UDM network element, so that the UDM network element can update the subscription location information of the first terminal device by using the geographical location information of the first terminal device based on the first indication. Therefore, without manual reconfiguration performed by an operator, the subscription location information can be automatically updated, without consuming long update time, thereby improving network access efficiency and convenience of the terminal device.

In a possible implementation, the second information update request further includes information about the terminal device, and the information about the terminal device is used to obtain the subscription location information of the first terminal device.

In a possible implementation, the information about the terminal device includes at least one of the following: an identifier of the first terminal device, an identifier of a second terminal device, a mailbox, and an account of social software.

According to a fifth aspect, this application further provides a communication apparatus. The apparatus includes: an obtaining unit, configured to: obtain an access request, where the access request includes access location information of a first terminal device; obtain subscription information of the first terminal device, where the subscription information includes subscription location information; and obtain permission information when confirming that the access location information of the first terminal device does not belong to the subscription location information, where the permission information is information for permitting the first terminal device to access a network at an access location corresponding to the access location information; and a permission unit, configured to permit, based on the permission information, the first terminal device to access the network at the access location corresponding to the access location information.

In a possible implementation, the access request further includes an identifier of the first terminal device; and that an obtaining unit is configured to obtain subscription information of the first terminal device includes: The obtaining unit is configured to obtain the subscription information of the first terminal device based on the identifier of the first terminal device.

In a possible implementation, the communication apparatus is an access management network element, the access management network element further includes a sending unit and a receiving unit, and the sending unit is configured to send an information obtaining request to a UDM network element, where the information obtaining request includes the identifier of the first terminal device; and that an obtaining unit is configured to obtain subscription information of the first terminal device includes: The obtaining unit is configured to receive, through the receiving unit, the subscription information sent by the UDM network element based on the identifier of the first terminal device.

In a possible implementation, the communication apparatus further includes a sending unit and a receiving unit, and the sending unit is configured to send a confirmation request to an NEF network element, where the confirmation request includes the access location information of the first terminal device; and that an obtaining unit is configured to obtain permission information includes: The obtaining unit is configured to receive the permission information from the NEF network element through the receiving unit.

In a possible implementation, the subscription information further includes information about the terminal device, and the confirmation request further carries the information about the terminal device.

In a possible implementation, the information about the terminal device includes one or more of the following: an identifier of a second terminal device, a mailbox, and an account name of social software.

In a possible implementation, the confirmation request further includes the subscription location information and/or the identifier of the first terminal device.

In a possible implementation, that an obtaining unit is configured to obtain permission information includes: The obtaining unit is configured to obtain a first parameter when the subscription information includes the first parameter, where the first parameter is used to indicate that the first terminal device is permitted to access the network at the access location corresponding to the access location information when the access location information of the first terminal device does not belong to the subscription location information.

In a possible implementation, the communication apparatus is an access management network element, the access management network element further includes a sending unit and a receiving unit, and the sending unit is configured to send a confirmation request to a UDM network element, where the confirmation request includes the access location information of the first terminal device; and that an obtaining unit is configured to obtain permission information includes: The obtaining unit is configured to receive, through the receiving unit, the permission information sent by the UDM network element based on the access location information of the first terminal device.

In a possible implementation, the communication apparatus is an access management network element, the communication apparatus further includes a sending unit and a receiving unit, and the sending unit is configured to send a confirmation request to an NEF network element, where the confirmation request includes the access location information of the first terminal device; and that an obtaining unit is configured to obtain permission information includes: The obtaining unit is configured to receive the permission information from a UDM network element through the receiving unit.

In a possible implementation, the communication apparatus is an access management network element, the apparatus further includes a sending unit, and the sending unit is configured to send a subscription information update request to a UDM network element, where the subscription information update request includes the access location information of the first terminal device, and the subscription information update request is used to update the subscription location information based on the access location information of the first terminal device.

In a possible implementation, the communication apparatus is a UDM network element, and that a permission unit is configured to permit, based on the permission information, the first terminal device to access the network at the access location corresponding to the access location information includes: The permission unit is configured to update the subscription location information based on the access location information of the first terminal device.

In a possible implementation, the apparatus further includes a sending unit, and the sending unit is configured to send an information update message to an access management network element, where the information update message includes the updated subscription location information.

In a possible implementation, that an obtaining unit is configured to obtain permission information includes: The obtaining unit is configured to obtain the permission information within a preset time period.

In a possible implementation, the access request includes indication information, and the indication information is used to indicate that the first network element obtains the permission information within the preset time period.

In a possible implementation, when the obtaining unit does not obtain the permission information within the preset time period, the apparatus further includes:
a sending unit, configured to send timer information to the first terminal device, where the timer information is used to indicate that the first terminal device sends the access request after a timer expires.

According to a sixth aspect, this application further provides a communication apparatus. The apparatus includes: an obtaining unit, configured to: obtain access location information of a first terminal device and a first indication, where the first indication is used to indicate to update subscription location information of the first terminal device based on the access location information of the first terminal device; and obtain subscription information of the first terminal device, where the subscription information includes the subscription location information of the first terminal device; and an updating unit, configured to update the subscription location information of the first terminal device based on the access location information of the first terminal device and the first indication.

In a possible implementation, that an obtaining unit is configured to obtain access location information of a first terminal device includes: The obtaining unit is configured to: obtain geographical location information of the first terminal device; and determine the access location information of the first terminal device based on the geographical location information of the first terminal device.

In a possible implementation, that an obtaining unit is configured to obtain subscription information of the first terminal device includes: The obtaining unit is configured to: obtain information about the terminal device; and obtain the subscription information of the first terminal device based on the information about the terminal device.

In a possible implementation, the information about the terminal device includes at least one of the following: an identifier of the first terminal device, an identifier of a second terminal device, a mailbox, and an account of social software.

In a possible implementation, the apparatus further includes a sending unit, configured to send an update success message to the first terminal device.

According to a seventh aspect, this application further provides a communication apparatus. The apparatus includes a sending unit, configured to send a first information update request to an NEF network element, where the first information update request includes geographical location information of a first terminal device and a first indication, and the first indication is used to indicate to update subscription location information of the first terminal device based on the geographical location information of the first terminal device.

In a possible implementation, the first information update request further includes information about the terminal device, and the information about the terminal device is used to obtain the subscription location information of the first terminal device.

In a possible implementation, the information about the terminal device includes at least one of the following: an identifier of the first terminal device, an identifier of a second terminal device, a mailbox, and an account of social software.

In a possible implementation, the apparatus further includes a receiving unit, configured to receive an update success message.

In a possible implementation, the first information update request is sent in one or more of the following manners: an SMS message, an email, and social software.

According to an eighth aspect, this application further provides a communication apparatus. The apparatus includes: a receiving unit, configured to receive a first information update request, where the first information update request includes geographical location information of a first terminal device and a first indication, and the first indication is used to indicate to update subscription location information of the first terminal device based on the geographical location information of the first terminal device; a determining unit, configured to determine access location information of the first terminal device based on the geographical location information of the first terminal device; and a sending unit, configured to send a second information update request to a UDM network element, where the second information update request includes the access location information of the first terminal device and the first indication.

In a possible implementation, the second information update request further includes information about the terminal device, and the information about the terminal device is used to obtain the subscription location information of the first terminal device.

In a possible implementation, the information about the terminal device includes at least one of the following: an identifier of the first terminal device, an identifier of a second terminal device, a mailbox, and an account of social software.

According to a ninth aspect, this application further provides a communication apparatus. The communication apparatus includes a memory and a processor, where the memory is configured to store instructions; and the processor is configured to execute the instructions in the memory, to perform the method according to any one of the first aspect to the fourth aspect and the possible implementations of the first aspect to the fourth aspect.

According to a tenth aspect, this application further provides a communication system. The communication system includes at least two communication apparatuses according to the fifth aspect to the eighth aspect.

According to an eleventh aspect, this application further provides a computer-readable storage medium. The computer-readable storage medium includes instructions. When the instructions are run on a computer, the computer is enabled to perform the method according to any one of the first aspect to the fourth aspect and the possible implementations of the first aspect to the fourth aspect.

According to a twelfth aspect, an embodiment of this application provides a chip or a chip system. The chip or the chip system includes at least one processor and a communication interface. The communication interface and the at least one processor are interconnected through a line. The at least one processor is configured to run a computer program or instructions, to perform the method according to any one of the first aspect and the possible implementations of the first aspect, or perform the method according to any one of the second aspect and the possible implementations of the second aspect, or perform the method according to any one of the third aspect and the possible implementations of the third aspect, or perform the method according to any one of the fourth aspect and the possible implementations of the fourth aspect.

The communication interface in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

DESCRIPTION OF EMBODIMENTS

The following clearly describes the technical solutions in embodiments of this application with reference to the accompanying drawings in embodiments of this application. In descriptions of this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more.

In addition, embodiments of this application are also applicable to another future-oriented communication technology. Network architectures and service scenarios described in this application are intended to describe the technical solutions in this application more clearly, and do not constitute a limitation on the technical solutions provided in this application. Persons of ordinary skill in the art may know that: With evolution of network architectures and emergence of new service scenarios, the technical solutions provided in this application are also applicable to similar technical problems.

Figure 1:
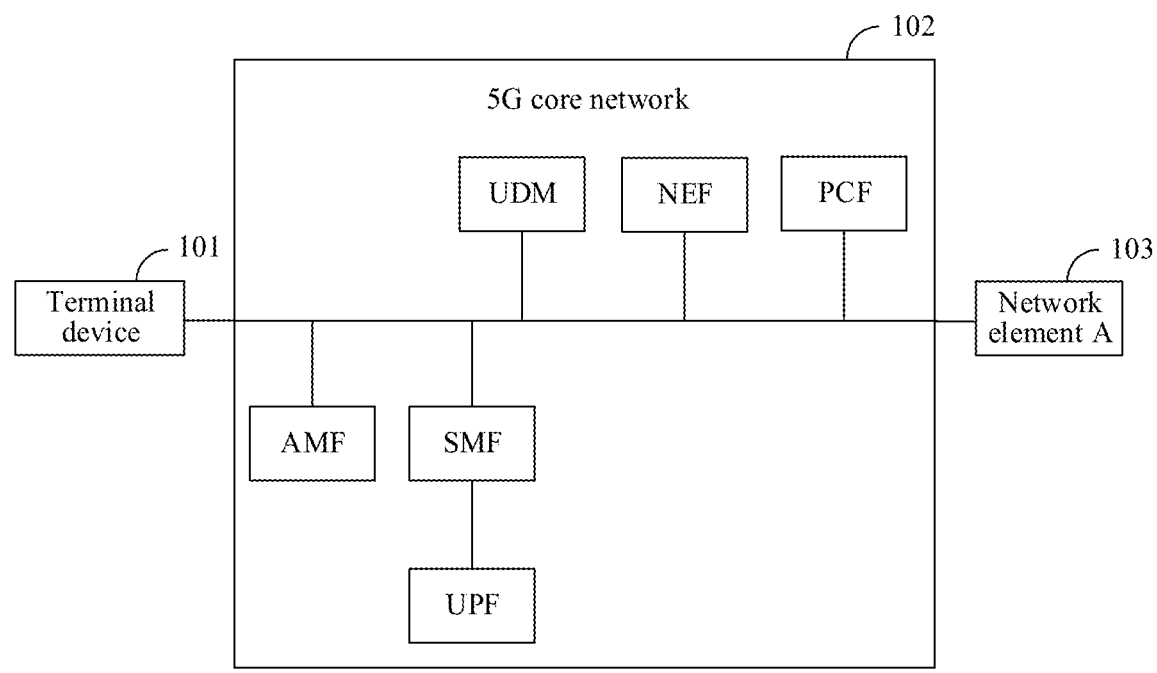
FIG. 1 is an example diagram of a system architecture to which an embodiment of this application is applied.

FIG. 1 is an example diagram of a system architecture to which an embodiment of this application is applied. As shown in FIG. 1, a terminal device 101, a 5G core network 102, and a network element A103 are included in the scenario. The terminal device 101 is connected to the 5G core network 102, and the 5G core network 102 is connected to the network element A103. The "connection" may be a direct connection, or may be an indirect connection.

The terminal device 101 may also be referred to as a user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a tablet, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, a wireless terminal in a smart home, a 5G-residential gateway (5G-RG) that supports 5G access, or the like. The terminal device provided in embodiments of this application may be a low-complexity terminal device and/or a terminal device in a coverage enhancement mode A.

For the 5G core network 102, some function network elements in the 5G core network are provided. The function network elements include an access and mobility management function (AMF) network element, a session management function (SMF) network element, a unified data management (UDM) network element, a user plane function (UPF) network element, a network exposure function (NEF) network element, and a policy control function (PCF) network element. Certainly, in the core network, another function network element may be further included. For details, refer to related descriptions in the 5G standard.

The AMF network element is a control plane network element provided by an operator network, and is mainly responsible for access control and mobility management for accessing the operator network by the terminal device, for example, including functions such as mobility status management, temporary user identity assignment, and user authentication and authorization.

The SMF network element is a control plane network element provided by the operator network, and is responsible for managing a protocol data unit (PDU) session of the terminal device. The PDU session is a channel used for transmission of a PDU, and transmission of the PDU needs to be performed between the terminal device 101 and a data network (DN) through the PDU session. The SMF network element is responsible for establishment, maintenance, deletion, and the like of the PDU session. The SMF network element includes session-related functions such as session management (for example, session establishment, modification, and release, including maintenance of a tunnel between the UPF network element and a radio access network (RAN)), selection and control of the UPF network element, service and session continuity (SSC) mode selection, and roaming.

The UPF network element is a gateway provided by an operator, and is a gateway for communication between the operator network and the DN. The UPF network element includes user plane-related functions such as packet routing and transmission, packet detection, service usage reporting, quality of service (QoS) processing, lawful interception, uplink packet detection, and downlink packet storage.

The PCF network element is a control plane function provided by the operator, and is configured to provide a policy of the PDU session for the SMF network element.

The policy may include an accounting-related policy, a QoS-related policy, an authorization-related policy, and the like.

The UDM network element is responsible for managing subscription information of the terminal device 101, and is responsible for notifying a corresponding network element when the subscription information is modified.

The NEF network element mainly supports a network capability exposure function, and externally exposes a network capability and a service. A 3GPP network function (NF) releases a function and an event to another NF through the NEF. The capability and event exposed by the NF can be securely exposed to a third-party application. The NEF stores/retrieve s structured data through a standardized interface (Nudr) of a unified data repository (UDR), and translates exchange information of an AF and exchange information of an internal network function. For example, the NEF performs conversion between an AF service identifier AF-Service-Identifier and internal 5G core information.

The network element A103 may be an application function (AF) network element, for example, an application function network element or an application function server in a network corresponding to a data network name (DNN), and is configured to provide an application layer service for the terminal device 101. When the AF provides the service for the terminal device 101, there are requirements on a QoS policy and a charging policy, and the network needs to be notified of the requirements. In addition, the AF also requires application-related information fed back by the core network. Alternatively, the network element A103 may be a newly added independent 5G function network element, and directly interacts with another network element in the 5G core network, to provide a corresponding service for the terminal device 101.

Figure 2:
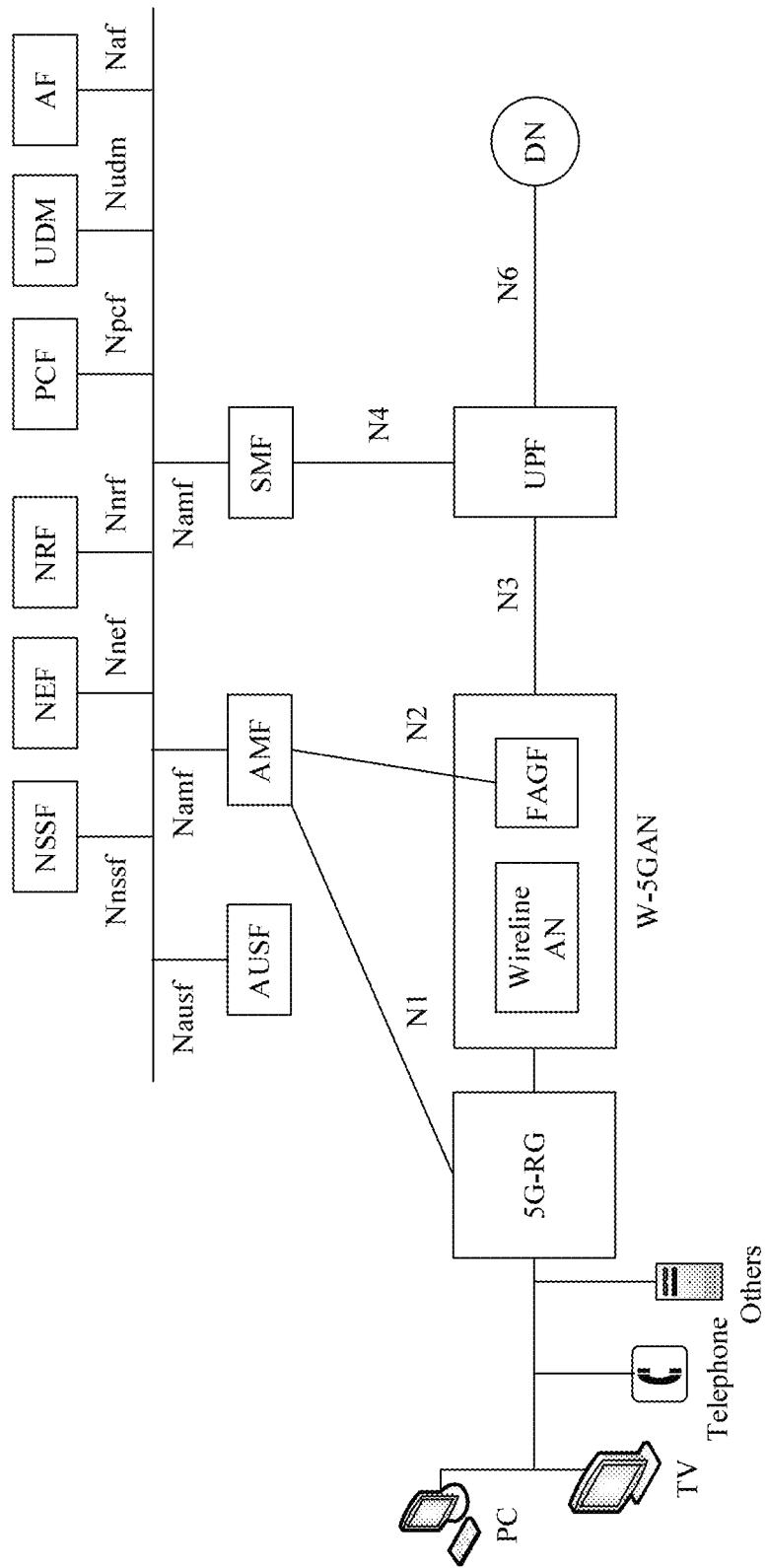
FIG. 2 is an example diagram of another system architecture to which an embodiment of this application is applied.

Alternatively, in another scenario, as shown in FIG. 2, the terminal device 101 is a 5G-RG. FIG. 2 is a schematic diagram of a scenario in which the 5G-RG accesses the 5G core network 102 through a fixed network. The fixed network may include a wired active network, an access gateway function (fixed access gateway function, FAGF), and the like. The 5G core network 102 is shown in the upper part of FIG. 2. The 5G core network not only includes the AMF network element, the SMF network element, the NEF network element, the PCF network element, and the UDM network element described in the foregoing scenario, but also includes an authentication server function (AUSF) network element, a network slice selection function (NSSF) network element, a network element repository function (NE repository function, NRF) network element, or the like. For specific descriptions of functions of the network elements, refer to related descriptions in the 5G standard.

Figure 3:
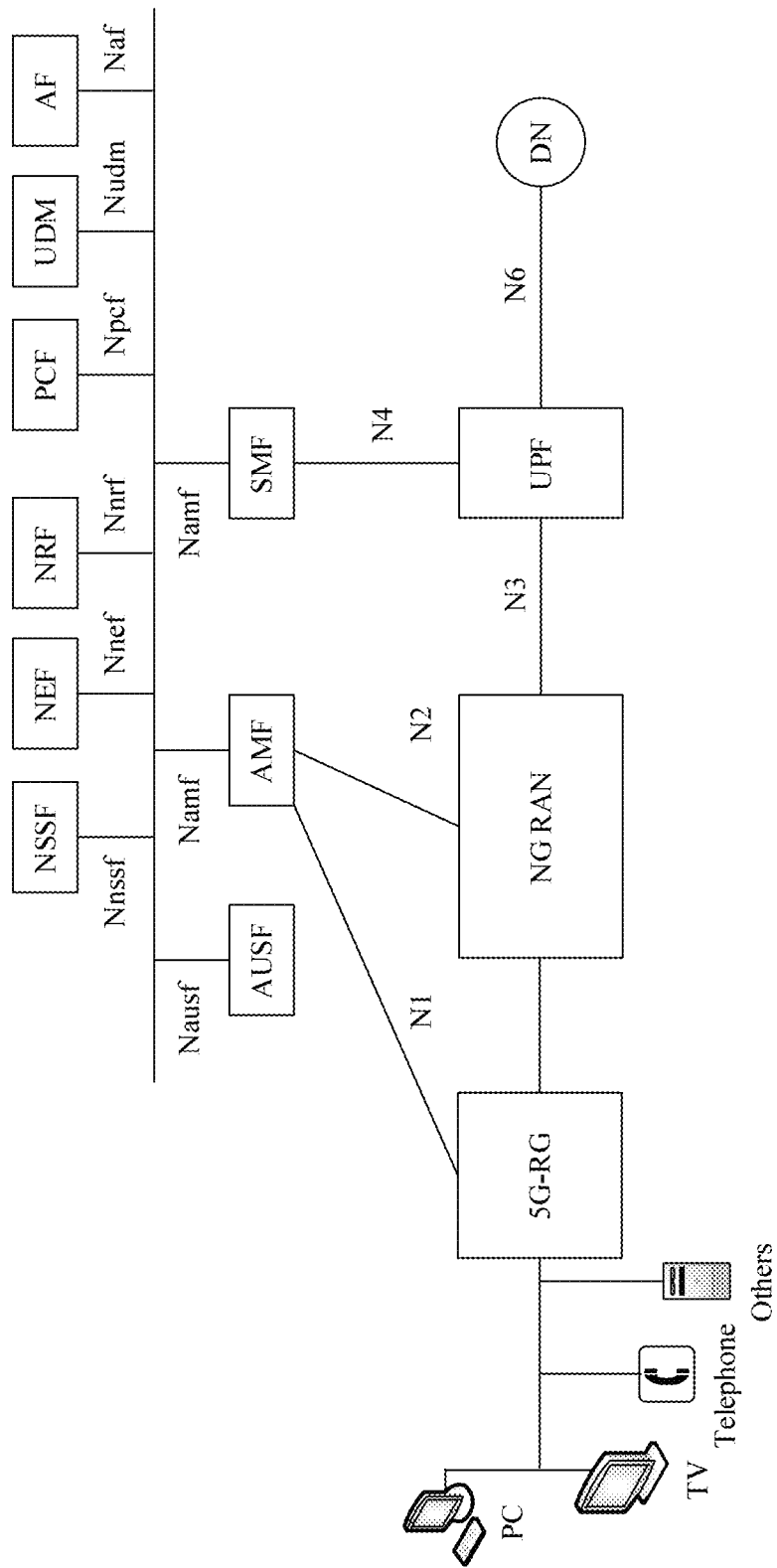
FIG. 3 is an example diagram of still another system architecture to which an embodiment of this application is applied.

Alternatively, in another scenario, as shown in FIG. 3, the terminal device 101 is still a 5G-RG. FIG. 3 is a schematic diagram of a scenario in which the 5G-RG accesses the 5G core network 102 through a 3GPP wireless network (an NG RAN). The 3GPP wireless network may include a next generation 3GPP radio access network, a 5G 3GPP access network, or the like. For specific descriptions of functions, refer to related descriptions in the 5G standard.

In this application, a first network element may be the AMF network element or the UDM network element in the 5G core network 102 shown in FIG. 1, and a first terminal device may be the terminal device 101 shown in FIG. 1. In this way, in a process of implementing network interaction between the terminal device 101 and the network element A103, the AMF network element or the UDM network element may first obtain an access request that includes access location information of the terminal device 101 and subscription information that includes subscription location information of the first terminal device, and then determine whether the access location information belongs to the subscription location information. When determining that the access location information does not belong to the subscription location information, the AMF network element or the UDM network element may permit, based on obtained permission information, the terminal device 101 to access a network at an access location corresponding to the access location information, to further implement network interaction with the network element A103. In this way, when there is no need to contact an operator to manually update the subscription information, the AMF network element or the UDM network element determines the access location information of the terminal device 101, so that the access location information becomes new subscription location information with reference to the obtained permission information. Therefore, the subscription information is automatically updated, without consuming long update time, thereby improving network access accuracy of the terminal device.

It should be noted that the foregoing several application scenarios are shown only for ease of understanding of this application, and an implementation of this application is not limited in this aspect. On the contrary, the implementation of this application may be applied to any applicable scenario.

It should be noted that the foregoing several application scenarios are shown only for ease of understanding of this application, and an implementation of this application is not limited in this aspect. On the contrary, the implementation of this application may be applied to any applicable scenario.

Based on the foregoing application scenario, an embodiment of this application provides a network access method. The following describes the method.

S401: A first network element obtains an access request, where the access request includes access location information of a first terminal device.

In this embodiment, any terminal device that accesses a network by using this embodiment is defined as a first terminal device. It may be understood that the first terminal device may be any terminal device mentioned in the descriptions of the terminal device 101, for example, the 5G-RG shown in FIG. 2 and FIG. 3. That the first terminal device accesses a network is a process in which the first terminal device obtains various services by accessing the 5G core network 502 shown in FIG. 1. For example, the first terminal device may exchange data with the network element A103 by accessing the 5G core network 502 shown in FIG. 1. In this way, subscription information such as network registration and online signup is updated, so that the first terminal device can access the network at a current access location.

When network access of the first terminal device is implemented, the first network element first needs to obtain, through an access network (for example, a 5G base station or a non-3GPP access gateway), the access request that includes the access location information of the first terminal device. The first network element may be the AMF network element or the UDM network element in the 5G core network 102 described above, or may be an MME network element. The access location information of the first terminal device may include cellular location information, for example, a cell ID, or wireless local area network (WLAN) access point information, for example, a service set identifier (SSID), or fixed access point location information, for example, a line identifier line ID.

It should be noted that, in this embodiment of this application, neither a network type of the network to be accessed nor a type of the access location information of the first terminal device is limited, and selection may be performed based on an actual situation. In this embodiment of this application, a fixed access network and a line ID that is used as the access location information of the first terminal device are subsequently used as an example for description.

S402: The first network element obtains subscription information of the first terminal device, where the subscription information includes subscription location information.

In this embodiment, the access request obtained in step S201 may include not only the access location information of the first terminal device, but also an identifier of the first terminal device. The identifier of the first terminal device refers to a user identifier that represents identity information of the first terminal device, and may include at least one of a subscription concealed identifier (SUCI), a subscription permanent identifier (SUPI), a mobile subscriber integrated services digital network number (mobile station integrated services digital network number, MSISDN), a temporary identifier, and the like.

On this basis, to improve network access accuracy of the first terminal device, the first network element further needs to obtain the subscription information of the first terminal device based on the identifier of the first terminal device. The subscription information includes the subscription location information, and the subscription location information refers to recorded information corresponding to a location area in which the first terminal device can access the network.

In an optional implementation of this embodiment, the first network element is an access management network element (an AMF network element or an MME network element), and an implementation process of step S402 may specifically include the following steps S4021 and S4022.

S4021: The access management network element sends an information obtaining request to a UDM network element, where the information obtaining request includes the identifier of the first terminal device.

In this implementation, after the access management network element (the AMF network element or the MME network element) sends the information obtaining request that includes the identifier of the first terminal device to the UDM network element, the UDM network element may obtain, based on the identifier, the subscription information corresponding to the first terminal device. The subscription information records the location area (namely, the subscription location information) in which the first terminal device is permitted to access the network.

S4022: The access management network element receives the subscription information sent by the UDM network element based on the identifier of the first terminal device.

In this implementation, the UDM network element is responsible for managing subscription information of each terminal device. Therefore, after receiving the information obtaining request that is sent by the access management network element and that includes the identifier of the first terminal device, the UDM network element may find, based on the identifier of the first terminal device, the subscription information corresponding to the first terminal device, to perform subsequent step S403.

S403: The first network element obtains permission information when the first network element confirms that the access location information of the first terminal device does not belong to the subscription location information, where the permission information is information for permitting the first terminal device to access the network at the access location corresponding to the access location information.

In this embodiment, after the first network element obtains the access request that includes the access location information of the first terminal device and the subscription information that includes the subscription location information of the first terminal device, the first network element further needs to determine whether the access location information of the first terminal device belongs to the subscription location information, that is, needs to determine whether the access location information belongs to the location area that is recorded in the subscription information corresponding to the first terminal device and in which the first terminal device accesses the network.

When the first network element confirms that the access location information of the first terminal device does not belong to the subscription location information, that is, the access location information does not belong to the location area that is recorded in the subscription information corresponding to the first terminal device and in which the first terminal device accesses the network, the first network element may obtain the permission information. The permission information refers to the information for permitting the first terminal device to access the network at the access location corresponding to the access location information. The permission message may be a first parameter in the subscription information, where the first parameter indicates that the first terminal device is permitted to access the network at the access location corresponding to the access location information when the access location information of the first terminal device does not belong to the subscription location information, and the first parameter may be indication information, the identifier of the first terminal device, and/or a type of the first terminal device; and/or the permission message may be information that is confirmed by the first terminal device or a second terminal device and that the first terminal device can access the network at the access location corresponding to the access location information. The second terminal device refers to a terminal device other than the first terminal device. An identifier of the second terminal device may have a specific mapping relationship with the identifier of the first terminal device. The mapping relationship reflects a one-to-one correspondence between the identifier of the first terminal device and the identifier of the second terminal device. An identifier of another corresponding terminal device may be determined based on an identifier of any terminal device by using the mapping relationship. In this way, when the first terminal device cannot confirm that the first terminal device can access the network at the access location corresponding to the access location information, the second terminal device may be used for confirmation. Alternatively, the second terminal device may be a terminal device through which a user logs in to an account of social software (such as a mailbox or WeChat).

It should be noted that when the first network element is the access management network element (the AMF network element or the MME network element) or the UDM network element, the first network element may obtain the permission message in six different ways, to permit the first terminal device to access the network at the access location corresponding to the access location information. For a specific implementation process, refer to detailed descriptions in subsequent embodiments.

S404: The first network element permits, based on the permission information, the first terminal device to access the network at the access location corresponding to the access location information.

In this embodiment, after obtaining the permission information for permitting the first terminal device to access the network at the access location corresponding to the access location information, the first network element may permit, based on the permission message, the first terminal device to access the network at the access location corresponding to the access location information, that is, the subscription information corresponding to the first terminal device is automatically updated.

In addition, in an optional implementation, the first network element may further send an access success message to the first terminal device. Therefore, the first terminal device can access the network at any time at the access location corresponding to the access location information based on the message, and does not need to contact an operator to reconfigure new subscription information for the first terminal device to implement network access, thereby improving network access accuracy of the first terminal device.

In conclusion, according to the network access method provided in this embodiment, when implementing network access of the first terminal device, the first network element first obtains the access request that includes the access location information of the first terminal device, where the first network element may be the access management network element or the UDM network element, and the access management network element may be the AMF network element or the MME network element. Then, the first network element may obtain the subscription information that includes the subscription location information of the first terminal device. Next, when the first network element confirms that the access location information of the first terminal device does not belong to the subscription location information, the first network element may obtain the permission information for permitting the first terminal device to access the network at the access location corresponding to the access location information, and may further permit, based on the permission message, the first terminal device to access the network at the access location corresponding to the access location information. It can be learned that, compared with a current method in which an operator is contacted to reconfigure new subscription information for the terminal device to implement network access, in this embodiment of this application, the first network element is used to first determine whether the access location information of the first terminal device belongs to the subscription location information; and when determining that the access location information does not belong to the subscription location information, permit, based on the obtained permission information, the first terminal device to access the network at the access location corresponding to the access location information, without consuming long time, thereby improving network access accuracy of the terminal device.

Next, this embodiment describes specific implementation processes of six different implementations of obtaining the permission message that are generated when the first network element is the access management network element (the AMF network element or the MME network element) or the UDM network element, to permit the first terminal device to access the network at the access location corresponding to the access location information.

Figure 5:
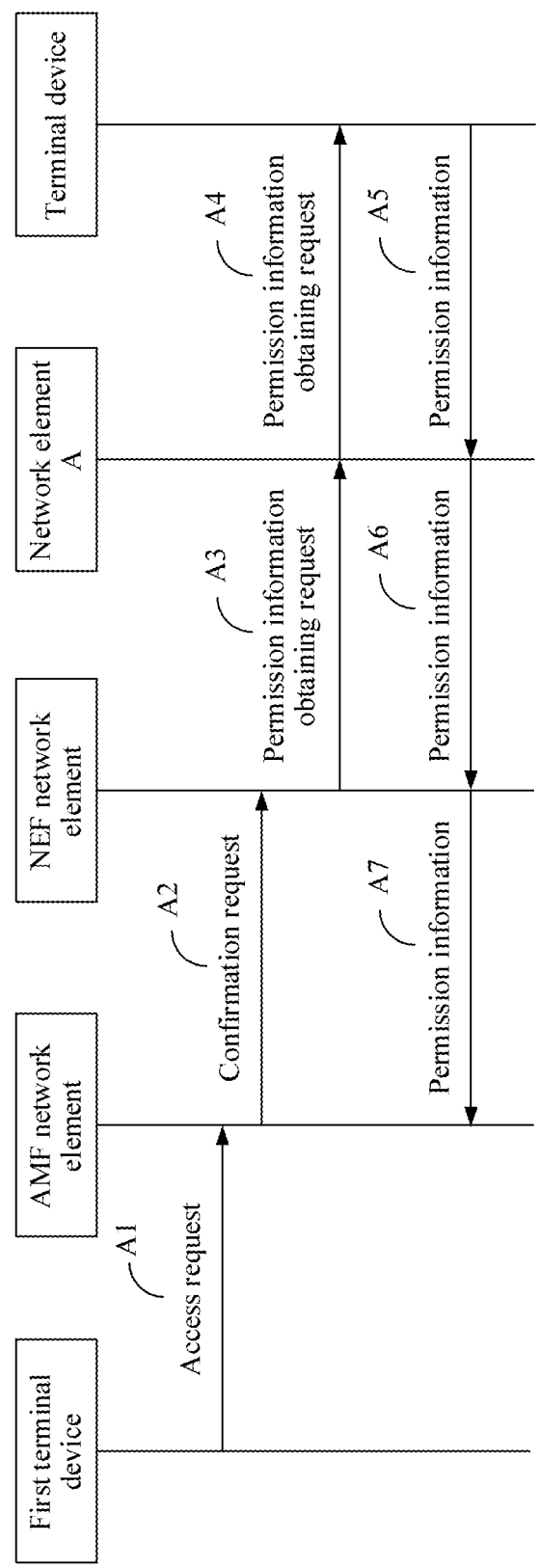
FIG. 5 is a schematic interaction diagram 1 of a network access method according to an embodiment of this application.

(1) In a first implementation of this embodiment, as shown in FIG. 5, the first network element is, for example, the AMF network element, and a network element A is an AF network element (namely, an application function network element that interacts with a terminal in a DNN network, an application server in a DNN network, or a logical function network element A in a 5G core network). The AMF network element may be used to obtain the permission message, to permit the first terminal device to access the network at the access location corresponding to the access location information. A specific implementation process may include the following steps A1 to A6.

Step A1: The AMF network element receives the access request sent by the first terminal device, where the access request includes the identifier of the first terminal device.

The identifier of the first terminal device refers to the user identifier that represents the identity information of the first terminal device, and may include at least one of the SUCI, the SUPI, the MSISDN, and the temporary identifier. In addition, in a process in which the first terminal device sends the access request to the AMF network element through an access network, the access network inserts the access location information of the first terminal device into the access request or sends the access location information of the first terminal device together with the access request to the AMF network element, so that the AMF network element receives the access location information and the identifier of the first terminal device.

Step A2: The AMF network element sends a confirmation request to an NEF network element, where the confirmation request includes the access location information of the first device.

When the AMF network element determines that the subscription location information in the subscription information does not include the access location information, and the subscription information does not include the first parameter, the AMF network element may send the confirmation request that includes the access location information of the first device to the NEF network element, to obtain, from the NEF network element, the permission message for permitting the first terminal device to access the network at the access location corresponding to the access location information.

It should be noted that the subscription information of the first terminal device that is obtained by the AMF network element in step S402 may further include information about the terminal device. In this case, in step A2, the confirmation request sent by the AMF network element to the NEF network element may further carry the information about the terminal device.

The information about the terminal device refers to at least one of the identifier of the first terminal device, the identifier of the second terminal device, a mailbox, an account name of social software, and the subscription location information. The identifier of the second terminal device refers to a user identifier that represents identity information of the second terminal device, and may include at least one of an SUCI, an SUPI, an MSISDN, and a temporary identifier. The second terminal device refers to a terminal device other than the first terminal device, and the identifier of the second terminal device may have a specific mapping relationship with the identifier of the first terminal device. Alternatively, the second terminal device may be a terminal device through which a user logs in to an account of social software (such as a mailbox or WeChat).

Step A3: The NEF network element sends a permission information obtaining request to the network element A, to obtain the permission information for permitting the first terminal device to access the network at the access location corresponding to the access location information.

As described in the foregoing descriptions of the network element A103, the network element A refers to an application function network element that can provide a service for a mobile terminal.

Step A4: The network element A sends the permission information obtaining request to the terminal device, to obtain the permission information for permitting the first terminal device to access the network at the access location corresponding to the access location information.

The permission information obtaining request includes the access location information of the first terminal device, and the permission information obtaining request is used to confirm whether the first terminal device can access the network at the access location corresponding to the access location information. The terminal device includes at least one of the first terminal device and the second terminal device. The terminal device may include at least one of the first terminal device and the second terminal device, and the second terminal device is a terminal device other than the first terminal device. For specific descriptions, refer to the foregoing embodiment.

It should be noted that, in step A4, the network element A may select any existing or future message sending manner based on the access location information of the first terminal device, to send the permission information obtaining request to the terminal device, for example, may send the permission information obtaining request in a manner such as an SMS message push, a WeChat push, or an email push. A specific sending manner may be selected based on an actual situation. This is not limited in this embodiment of this application.

Step A5: The terminal device replies the permission information to the network element A.

It may be understood that, the terminal device may also select any one of various existing or future message reply manners, to reply the permission information to the network element, for example, may reply the permission information in a manner such as an SMS message reply, a WeChat reply, an email confirmation, or a web page link confirmation. A specific reply manner may be selected based on an actual situation. This is not limited in this embodiment of this application.

Step A6: The network element A receives the permission message from the terminal device, and sends the permission message to the NEF network element.

Step A7: The AMF network element receives the permission information that is obtained by the NEF network element based on the access location information of the first terminal device, and permits, based on the permission message, the first terminal device to access the network at the access location corresponding to the access location information.

Further, in a possible implementation, after obtaining the permission message and confirming that the first terminal device can access the network at the access location corresponding to the access location information, the AMF network element may further send a subscription information update request that includes the access location information (such as a line ID) of the first terminal device to the UDM network element. In this way, the UDM network element updates the subscription information corresponding to the first terminal device, that is, the UDM network element may write the access location information (such as the line ID) of the first terminal device into a list of areas permitted to be accessed (a line ID list), and may also store a service type, an access validity period, and the like related to the location area. In addition, the UDM network element may also send updated subscription information of the first terminal device to a UDR for data storage.

Figure 6:
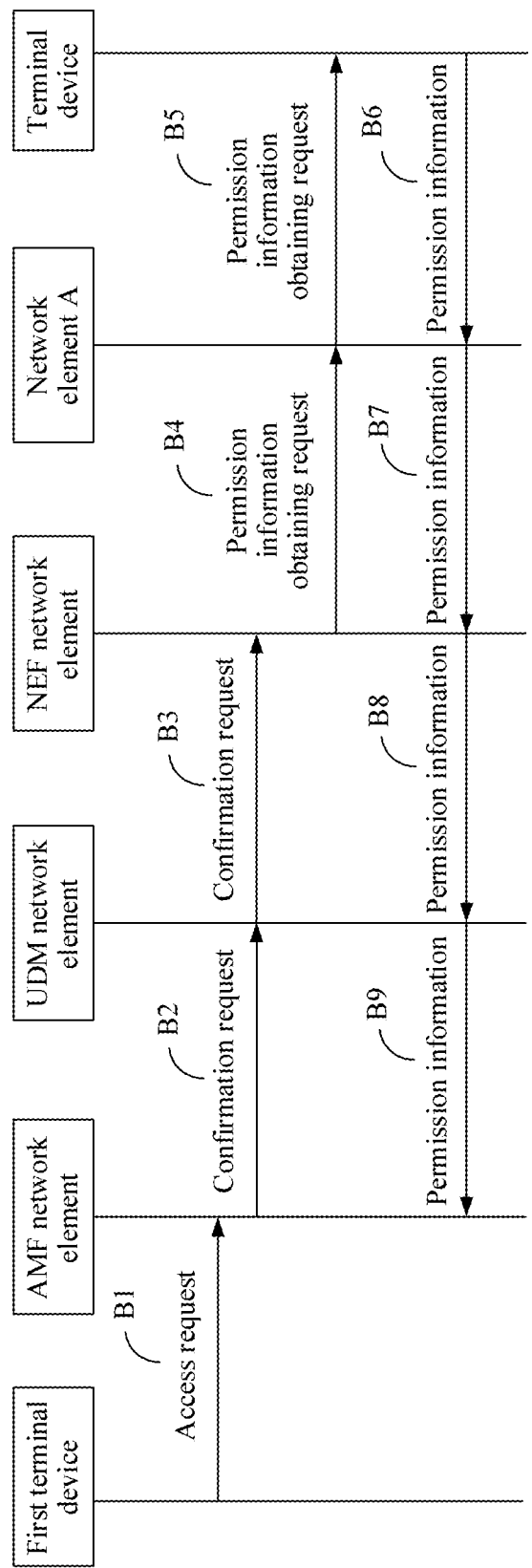
FIG. 6 is a schematic interaction diagram 2 of a network access method according to an embodiment of this application.

(2) In a first implementation of this embodiment, as shown in FIG. 6, the first network element is, for example, the AMF network element, and a network element A is still an AF network element. The UDM network element may be used to obtain the permission message, and send the permission message to the AMF network element, to permit the first terminal device to access the network at the access location corresponding to the access location information. A specific implementation process may include the following steps B1 to B9.

Step B1: The AMF network element receives the access request sent by the first terminal device, where the access request includes the identifier of the first terminal device.

It should be noted that step B1 is consistent with step A1. For related descriptions, refer to the descriptions of step A1. Details are not described herein again.

Step B2: The AMF network element sends a confirmation request to the UDM network element, where the confirmation request includes the access location information of the first device.

It should be noted that step B2 is consistent with step A2, and only the "NEF network element" in step A2 is replaced with the "UDM network element". For related descriptions, refer to the descriptions of step A2. Details are not described herein again.

Step B3: The UDM network element sends a permission information obtaining request to the NEF network element, to obtain the permission information for permitting the first terminal device to access the network at the access location corresponding to the access location information.

It should be noted that the UDM may not only directly send the permission information obtaining request to the NEF network element, but also send the permission information obtaining request to the NEF network element through a UDR network element. A specific sending manner may be selected based on an actual situation. This is not limited in this embodiment.

Step B4: The NEF network element sends the permission information obtaining request to the network element A, to obtain the permission information for permitting the first terminal device to access the network at the access location corresponding to the access location information.

Step B5: The network element A sends the permission information obtaining request to the terminal device, to obtain the permission information for permitting the first terminal device to access the network at the access location corresponding to the access location information.

Step B6: The terminal device replies the permission information to the network element A.

Step B7: The network element A receives the permission message from the terminal device, and sends the permission message to the NEF network element.

It should be noted that steps B4 to B7 are consistent with steps A3 to A6. For related descriptions, refer to the descriptions of steps A3 to A6. Details are not described herein again.

Step B8: The NEF network element sends the permission message to the UDM network element.

It should be noted that, if the UDM sends the permission information obtaining request to the NEF network element through the UDR network element in step B3, after obtaining the permission message, the NEF network element first sends the permission message to the UDR network element, and then sends the permission message to the UDM network element through the UDR network element. In this way, after the UDM network element obtains the permission message and confirms that the first terminal device is permitted to access the network corresponding to the access location information, the UDM network element may update, based on the access location information of the first terminal device that is included in the permission information, the subscription information corresponding to the first terminal device, for example, the access location information of the first terminal device is used as the subscription location information of the first terminal device.

For example, the first terminal device is a 5G-RG. After obtaining the permission information that permits to update the subscription location information of the 5G-RG, where the subscription location information may include a 5G-RG subscriber identifier and the access location information, the NEF network element first sends the subscription location information to the UDR network element, then the UDR network element sends, to the UDM network element, a subscription location update message that includes a location at which the 5G-RG is permitted to access, where the subscription location update message includes the 5G-RG subscriber identifier and the current access location, to update the subscription location information of the 5G-RG.

Step B9: The AMF network element receives the permission information that is obtained by the UDM network element based on the access location information of the first terminal device, and permits, based on the permission message, the first terminal device to access the network at the access location corresponding to the access location information.

Specifically, the UDM network element may send updated subscription information to the AMF network element. The updated subscription information includes the access location information of the first terminal device used as the subscription location information, to indicate that the access location information of the first terminal device belongs to the subscription location information, so that the AMF network element provides a service for the first terminal device (that is, the first terminal device is permitted to access the network at the access location corresponding to the access location information).

It should be noted that, in a possible implementation of this embodiment, when the first network element is the UDM network element, after the network element A sends the permission information to the UDM network element, that is, after the UDM network element obtains the permission message and confirms that the first terminal device is permitted to access the network corresponding to the access location information, the UDM network element may update the subscription information corresponding to the first terminal device based on the access location information of the first terminal device that is included in the permission information, for example, use the access location information of the first terminal device as the subscription location information of the first terminal device. In addition, the UDM network element sends an information update message to the AMF network element. The information update message includes the updated subscription information of the first terminal device, to indicate that the access location information of the first terminal device belongs to the subscription location information, so that the AMF network element provides a service for the first terminal device (that is, the first terminal device is permitted to access the network at the access location corresponding to the access location information).

Specifically, after the network element A sends, to the UDM network element, the permission information that includes the access location information, the identifier, and the like of the first terminal device, the UDM network element may write the access location information (for example, the line ID) of the first terminal device into a list of areas permitted to be accessed (a line ID list), and may also store a service type, an access validity period, and the like related to the location area. In addition, the UDM network element may also send the updated subscription information of the first terminal device to the UDR for data storage, and send the updated subscription information to the AMF network element, to indicate that the access location information of the first terminal device belongs to the subscription location information, so that the AMF network element provides a normal service for the first terminal. Optionally, the AMF network element notifies the first terminal device that the first terminal device can access the network at the access location corresponding to the access location information.

Figure 7:
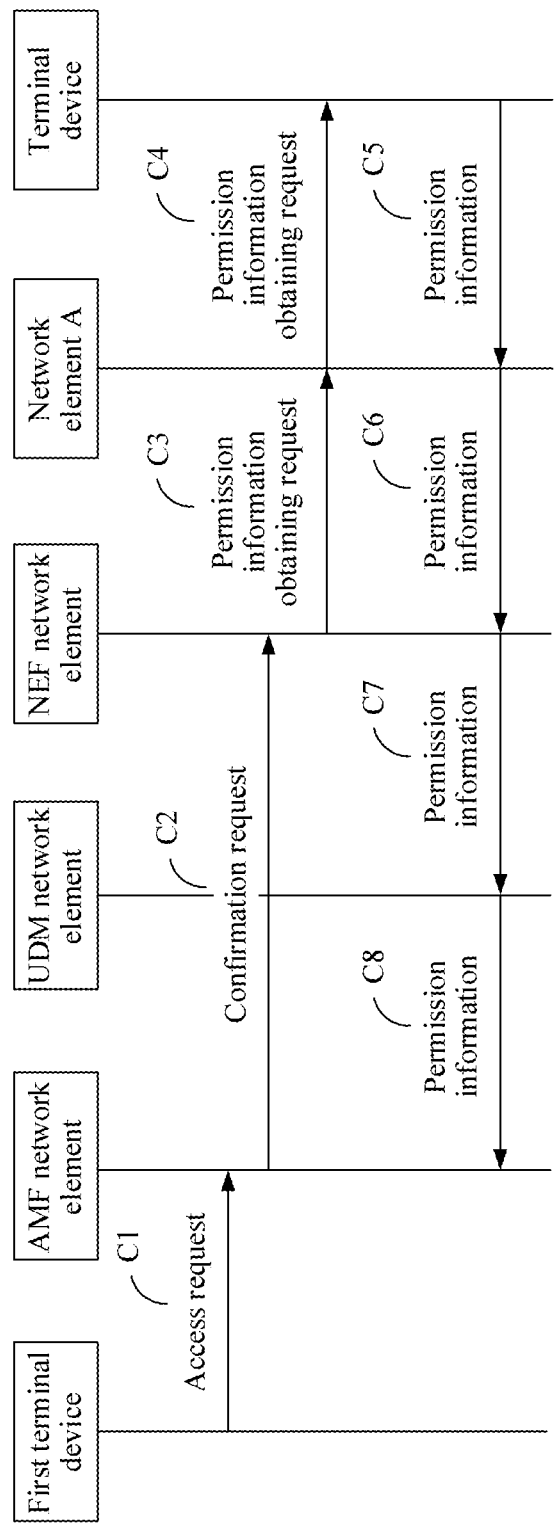
FIG. 7 is a schematic interaction diagram 3 of a network access method according to an embodiment of this application.

(3) In a first implementation of this embodiment, as shown in FIG. 7, the first network element is, for example, the AMF network element, and a network element A is still an AF network element. The AMF network element obtains the permission message, to permit the first terminal device to access the network at the access location corresponding to the access location information. A specific implementation process may include the following steps C1 to C8.

Step C1: The AMF network element receives the access request sent by the first terminal device, where the access request includes the identifier of the first terminal device.

Step C2: The AMF network element sends a confirmation request to an NEF network element, where the confirmation request includes the access location information of the first device.

Step C3: The NEF network element sends a permission information obtaining request to the network element A, to obtain the permission information for permitting the first terminal device to access the network at the access location corresponding to the access location information.

Step C4: The network element A sends the permission information obtaining request to the terminal device, to obtain the permission information for permitting the first terminal device to access the network at the access location corresponding to the access location information.

Step C5: The terminal device replies the permission information to the network element A.

Step C6: The network element A receives the permission message from the terminal device, and sends the permission message to the NEF network element.

It should be noted that steps C1 to C6 are consistent with steps A1 to A6. For related descriptions, refer to the descriptions of steps A1 to A6. Details are not described herein again.

Step C7: The NEF network element sends the permission message to the UDM network element.

Step C8: The AMF network element receives the permission information that is obtained by the UDM network element based on the access location information of the first terminal device, and permits, based on the permission message, the first terminal device to access the network at the access location corresponding to the access location information.

It should be noted that steps C7 and C8 are consistent with steps B8 and B9. For related descriptions, refer to the descriptions of steps B8 and B9. Details are not described herein again.

(4) In a first implementation of this embodiment, the first network element is, for example, the AMF network element, and a network element A is still an AF network element. In a process of performing steps A1 to A7 to obtain the permission message, in step A1, the access request that is sent by the first terminal device and that is received by the AMF network element may include indication information, and the indication information is used to indicate that the AMF network element obtains the permission information within a preset time period. Before performing step A2, the AMF network element may start timing, to monitor network access time in real time. In addition, before timing time reaches the end of the preset time period, if the AMF network element receives the permission message, the AMF network element may confirm, based on the permission message, that the first terminal device is permitted to access the network at the access location corresponding to the access location information.

Specifically, the AMF network element may locally set a timer with long time for a network access procedure, to monitor the network access procedure in real time. Before timing time of the timer reaches the end of the preset time period, if the AMF network element receives the permission message, the AMF network element may confirm, based on the permission message, that the first terminal device is permitted to access the network at the access location corresponding to the access location information. Further, the AMF network element may send the permission information to the first terminal device. The preset time period refers to preset maximum time that needs to be spent by the first terminal device to access a network once. If the preset time period is exceeded, it indicates that network access herein fails, and a next network access operation needs to be performed again.

In addition, in an optional implementation, if the AMF network element does not receive the permission message before the timing time of the timer reaches the end of the preset time period, the AMF network element may send timer information to the first terminal device. The timer information is used to indicate that the first terminal device sends the access request after a timer expires.

In this implementation, if the AMF network element still does not receive, before a first preset time period ends, the permission message sent by the terminal device, the AMF network element may confirm that the access location information of the first terminal device does not belong to the subscription location information, that is, the first terminal device is not permitted to access the network at the access location corresponding to the access location information. In this case, the AMF network element may send the timer information to the first terminal device, and the timer information is used to indicate that the first terminal device sends the access request after a timer expires.

A waiting time period may be preset by using the timer, to indicate the first terminal device to perform a next network access operation again after the waiting time period meets the time period (that is, the timer expires), that is, send the access request again.

It should be noted that, in addition to the AMF network element, the first terminal device may initiate real-time monitoring of the network access time. Specifically, the first terminal device may add a "long-time network access" indication message to information (for example, a message 3 or a message 5) exchanged with a radio access network (RAN) logical network element, to indicate that the network access process may take long time. After receiving the indication, the RAN may locally set the timer with long time for the network access procedure, to monitor the network access procedure. Before the timing time of the timer reaches the end of the preset time period, if the network access procedure does not normally end, for example, the RAN has not received any N2 message (for example, a downlink NAS transport message or an initial context setup request message) sent by the AMF network element, the RAN may determine that network access herein fails, and need to disconnect an air interface connection to the first terminal device.

(5) In a first implementation of this embodiment, the first network element is, for example, the AMF network element, and a network element A is still an AF network element. In a process of performing steps B1 to B9 to obtain the permission message, in step B1, the access request that is sent by the first terminal device and that is received by the AMF network element may include indication information, and the indication information is used to indicate that the AMF network element obtains the permission information within a preset time period. Before performing step B2, the AMF network element may start timing, to monitor network access time in real time. In addition, before timing time reaches the end of the preset time period, if the AMF network element receives the permission message, the AMF network element may confirm, based on the permission message, that the first terminal device is permitted to access the network at the access location corresponding to the access location information.

Specifically, the AMF network element may locally set a timer with long time for a network access procedure, to monitor the network access procedure in real time. Before timing time of the timer reaches the end of the preset time period, if the AMF network element receives the permission message, the AMF network element may confirm, based on the permission message, that the first terminal device is permitted to access the network at the access location corresponding to the access location information. Further, the AMF network element may send the permission information to the first terminal device. The preset time period refers to preset maximum time that needs to be spent by the first terminal device to access a network once. If the preset time period is exceeded, it indicates that network access herein fails, and a next network access operation needs to be performed again.

In addition, in an optional implementation, if the AMF network element does not receive the permission message before the timing time of the timer reaches the end of the preset time period, the AMF network element may send timer information to the first terminal device. The timer information is used to indicate that the first terminal device sends the access request after a timer expires.

In this implementation, if the AMF network element still does not receive, before a first preset time period ends, the permission message sent by the terminal device, the AMF network element may confirm that the access location information of the first terminal device does not belong to the subscription location information, that is, the first terminal device is not permitted to access the network at the access location corresponding to the access location information. In this case, the AMF network element may send the timer information to the first terminal device, and the timer information is used to indicate that the first terminal device sends the access request after a timer expires.

A waiting time period may be preset by using the timer, to indicate the first terminal device to perform a next network access operation again after the waiting time period meets the time period (that is, the timer expires), that is, send the access request again.

It should be noted that, in addition to the AMF network element, the first terminal device may initiate real-time monitoring of the network access time. Specifically, the first terminal device may add a "long-time network access" indication message to information (for example, a message 3 or a message 5) exchanged with a RAN logical network element, to indicate that the network access process may take long time. After receiving the indication, the RAN may locally set the timer with long time for the network access procedure, to monitor the network access procedure. Before the timing time of the timer reaches the end of the preset time period, if the network access procedure does not normally end, for example, the RAN has not received any N2 message (for example, a downlink NAS transport message or an initial context setup request message) sent by the AMF network element, the RAN may determine that network access herein fails, and need to disconnect an air interface connection to the first terminal device.

It should be noted that, in a possible implementation of this embodiment, when the first network element is the UDM network element, the "AMF network element" may be replaced with the "UDM network element" when the real-time monitoring of the network access time is performed.

(6) In a first implementation of this embodiment, the first network element is, for example, the AMF network element, and a network element A is still an AF network element. In a process of performing steps C1 to C8 to obtain the permission message, in step C1, the access request that is sent by the first terminal device and that is received by the AMF network element may include indication information, and the indication information is used to indicate that the AMF network element obtains the permission information within a preset time period. Before performing step C2, the AMF network element may start timing, to monitor network access time in real time. In addition, before timing time reaches the end of the preset time period, if the AMF network element receives the permission message, the AMF network element may confirm, based on the permission message, that the first terminal device is permitted to access the network at the access location corresponding to the access location information.

Specifically, the AMF network element may locally set a timer with long time for a network access procedure, to monitor the network access procedure in real time. Before timing time of the timer reaches the end of the preset time period, if the AMF network element receives the permission message, the AMF network element may confirm, based on the permission message, that the first terminal device is permitted to access the network at the access location corresponding to the access location information. Further, the AMF network element may send the permission information to the first terminal device. The preset time period refers to preset maximum time that needs to be spent by the first terminal device to access a network once. If the preset time period is exceeded, it indicates that network access herein fails, and a next network access operation needs to be performed again.

In addition, in an optional implementation, if the AMF network element does not receive the permission message before the timing time of the timer reaches the end of the preset time period, the AMF network element may send timer information to the first terminal device. The timer information is used to indicate that the first terminal device sends the access request after a timer expires.

In this implementation, if the AMF network element still does not receive, before a first preset time period ends, the permission message sent by the terminal device, the AMF network element may confirm that the access location information of the first terminal device does not belong to the subscription location information, that is, the first terminal device is not permitted to access the network at the access location corresponding to the access location information. In this case, the AMF network element may send the timer information to the first terminal device, and the timer information is used to indicate that the first terminal device sends the access request after a timer expires.

A waiting time period may be preset by using the timer, to indicate the first terminal device to perform a next network access operation again after the waiting time period meets the time period (that is, the timer expires), that is, send the access request again.

It should be noted that, in addition to the AMF network element, the first terminal device may initiate real-time monitoring of the network access time. Specifically, the first terminal device may add a "long-time network access" indication message to information (for example, a message 3 or a message 5) exchanged with a RAN logical network element, to indicate that the network access process may take long time. After receiving the indication, the RAN may locally set the timer with long time for the network access procedure, to monitor the network access procedure. Before the timing time of the timer reaches the end of the preset time period, if the network access procedure does not normally end, for example, the RAN has not received any N2 message (for example, a downlink NAS transport message or an initial context setup request message) sent by the AMF network element, the RAN may determine that network access herein fails, and need to disconnect an air interface connection to the first terminal device.

In correspondence to the foregoing network access method, an embodiment of this application further provides an information update method. The following describes the method.

Figure 8:
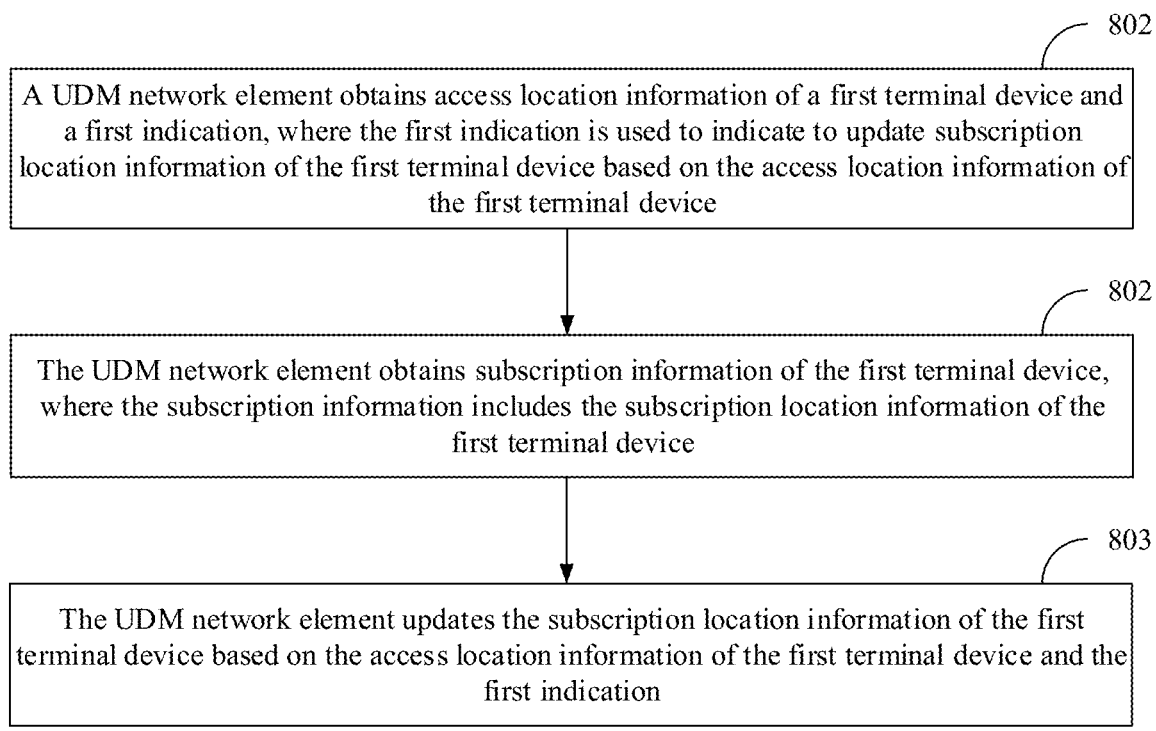
FIG. 8 is a flowchart of an information update method according to an embodiment of this application.

FIG. 8 is a flowchart of an information update method according to an embodiment of this application. The method may specifically include the following steps.

S801: A UDM network element obtains access location information of a first terminal device and a first indication, where the first indication is used to indicate to update subscription location information of the first terminal device based on the access location information of the first terminal device.

The UDM network element may receive a subscription information update request sent by an NEF network element, where the subscription information update request may include the access location information of the first terminal device and the first indication, and the first indication is used to indicate to update the subscription location information of the first terminal device based on the access location information of the first terminal device.

Specifically, after receiving the subscription information update request sent by the terminal device through a network element A, the NEF network element may send the subscription information update request to the UDM network element. The subscription information update request may include an identifier and the access location information of the first terminal device. Further, the NEF network element may send the subscription information update request to the UDM network element.

Specifically, an implementation process of step S801 may specifically include the following steps S8011 and S8012.

S8011: The UDM network element obtains geographical location information of the first terminal device.

The geographical location information of the first terminal device may be specifically a physical location, for example, a house number.

S8012: The UDM network element determines the access location information of the first terminal device based on the geographical location information of the first terminal device.

In this embodiment, after receiving the geographical location information (for example, the house number) of the first terminal device, namely, a specific physical location, the UDM network element may further determine the current access location information of the first terminal device based on the geographical location information, that is, determine current cellular location information such as a cell ID, or current WLAN access point information such as an SSID, or current fixed access point location information such as a line ID of the first terminal device.

S802: The UDM network element obtains subscription information of the first terminal device, where the subscription information includes the subscription location information of the first terminal device.

After receiving the subscription information update request, the UDM network element may further obtain, based on the identifier of the first terminal device that is included in the subscription information update request, the subscription information corresponding to the identifier. The subscription information is configured by an operator, and includes the subscription location information of the first terminal device, that is, records lawful access location information for permitting the first terminal device to access a network.

In an optional implementation of this embodiment, an implementation process of step S802 may specifically include the following steps S8021 and S8022.

S8021: The UDM network element obtains information about the terminal device.

The information about the terminal device includes at least one of the identifier of the first terminal device, an identifier of a second terminal device, a mailbox, and an account of social software. For specific descriptions, refer to the content of step A2 in the foregoing embodiment.

S8022: The UDM network element obtains the subscription information of the first terminal device based on the information about the terminal device.

It should be noted that the implementation process of step S8022 is consistent with some content described in step S402. For related descriptions, refer to the descriptions of step S402. Details are not described herein again.

S803: The UDM network element updates the subscription location information of the first terminal device based on the access location information of the first terminal device and the first indication.

The UDM network element may update, based on the first indication, the access location information of the first terminal device as the subscription location information to the subscription information corresponding to the first terminal device, to indicate that the first terminal device can access the network based on the access location information.

Specifically, after the UDM network element obtains the first indication that indicates to update the subscription location information of the first terminal device based on the access location information of the first terminal device, the UDM network element may update, based on the first indication, the access location information of the first terminal device as the subscription location information to the subscription information corresponding to the first terminal device, that is, the subscription location information is automatically updated.

Further, in an optional implementation, after step S803 is performed, to be specific, after the UDM network element updates the subscription location information of the first terminal device based on the access location information of the first terminal device, the UDM network element may further send an update success message to the first terminal device, where the update success message is used to indicate that the subscription location information in the subscription information of the first terminal device includes the access location information of the first terminal device.

Specifically, after updating the subscription location information of the first terminal device based on the access location information of the first terminal device, the UDM network element may further send the update success message to the NEF network element, where the update success message is used to indicate that the subscription location information in the subscription information of the first terminal device includes the access location information of the first terminal device. Then, the NEF network element may forward the update success message to the network element A, and the network element A forwards the update success message to the first terminal device in a manner such as an SMS message, WeChat, an email, or a web page link. A specific forwarding manner may be selected based on an actual situation. This is not limited in this embodiment of this application.

In conclusion, according to the information update method provided in this embodiment, when updating the subscription location information of the first terminal device, the UDM network element first obtains the access location information of the first terminal device and the first indication, where the first indication is used to indicate to update the subscription location information of the first terminal device based on the access location information of the first terminal device. Then, after obtaining the subscription information that includes the subscription location information of the first terminal device, the UDM network element may update the subscription location information of the first terminal device based on the obtained access location information of the first terminal device and the obtained first indication. It can be learned that, compared with a current method in which an operator is contacted to manually reconfigure new subscription location information for the terminal device, in this embodiment of this application, the UDM network element updates the subscription location information of the first terminal device by using the obtained access location information of the first terminal device and the obtained first indication. Therefore, without manual reconfiguration performed by the operator, the subscription location information can be automatically updated, without consuming long update time, thereby improving network access efficiency and convenience of the terminal device.

In correspondence to the foregoing information update method applied to the UDM network element, an embodiment of this application further provides an information update method applied to a second terminal device. The method includes: The second terminal device sends a first information update request to an NEF network element, where the first information update request includes geographical location information of a first terminal device and a first indication, and the first indication is used to indicate to update subscription location information of the first terminal device based on the geographical location information of the first terminal device.

Specifically, to update the subscription location information of the first terminal device, the second terminal device may first send a first subscription information update request to a network element A in a manner such as an SMS message, an email, social software, or a web page link, then the network element A forwards the subscription information update request to the NEF network element, and further the NEF network element may forward the subscription information update request to a UDM network element. The first subscription information update request may include the geographical location information of the first terminal device and the first indication. The second terminal device refers to a terminal device that matches user contact information that is included in subscription information corresponding to the first terminal device.

In an optional implementation, the first subscription information update request may further include information about the terminal device, to obtain the subscription location information of the first terminal device. The information about the terminal device includes at least one of an identifier of the first terminal device, an identifier of the second terminal device, a mailbox, and an account of social software.

Based on this, after receiving the subscription information update request, the UDM network element may update, based on the indication of the update request and the geographical location information of the first terminal device, the subscription location information in the subscription information corresponding to the identifier of the first terminal device. For a specific update process, refer to the related descriptions of the implementations (1) and (2). Details are not described herein again.

In addition, in an optional implementation, the second terminal device may receive an update success message sent by the UDM network element, where the update success message is used to indicate that the subscription location information in the subscription information of the first terminal device includes access location information corresponding to the geographical location information of the first terminal device.

In this implementation, after the UDM network element updates the subscription location information in the subscription information corresponding to the identifier of the first terminal device, to be specific, after the UDM network element updates, to the subscription information corresponding to the first terminal device, the access location information corresponding to the geographical location information of the first terminal device as the subscription location information, the UDM network element may further send the update success message to the network element A, to indicate that the subscription location information in the subscription information of the first terminal device includes the access location information corresponding to the geographical location information of the first terminal device. Then, the network element A forwards the update success message to the second terminal device in an existing or future information sending manner such as an SMS message, WeChat, an email, or a web page link. A specific forwarding manner may be selected based on an actual situation. This is not limited in this embodiment of this application.

Figure 9:
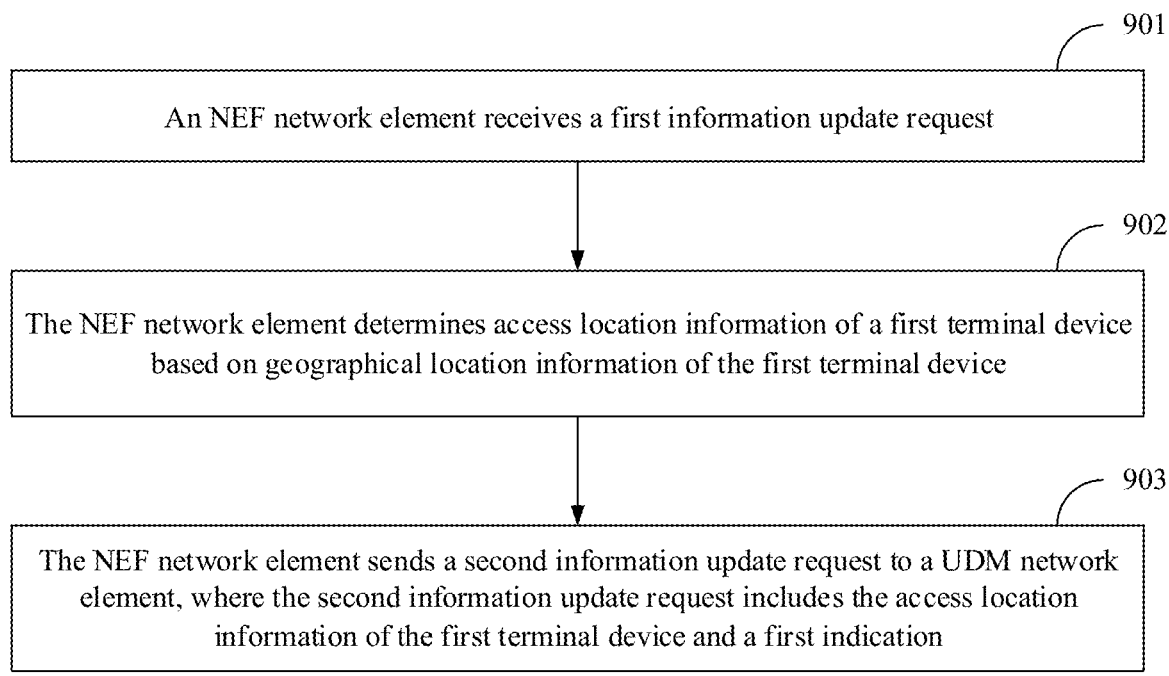
FIG. 9 is a flowchart of another information update method according to an embodiment of this application.

In correspondence to the foregoing information update methods applied to the UDM network element and the second terminal device, an embodiment of this application further provides an information update method applied to an NEF network element. As shown in FIG. 9, the method may specifically include the following steps.

S901: The NEF network element receives a first information update request.

The first information update request includes geographical location information of a first terminal device and a first indication, and the first indication is used to indicate to update subscription location information of the first terminal device based on the geographical location information of the first terminal device.

Specifically, to update the subscription location information of the first terminal device, a second terminal device may first send a first subscription information update request to a network element A in a manner such as an SMS message, an email, social software, or a web page link, and then the network element A forwards the subscription information update request to the NEF network element. Therefore, after receiving the first information update request that includes the geographical location information of the first terminal device and the first indication, the NEF network element may continue to perform subsequent step S902.

S902: The NEF network element determines access location information of the first terminal device based on the geographical location information of the first terminal device.

In this embodiment, after receiving the geographical location information (for example, a house number) of the first terminal device at a specific physical location, the NEF network element may further determine the current access location information of the first terminal device based on the geographical location information, that is, determine current cellular location information such as a cell ID, or current WLAN access point information such as an SSID, or current fixed access point location information such as a line ID of the first terminal device.

S903: The NEF network element sends a second information update request to a UDM network element, where the second information update request includes the access location information of the first terminal device and the first indication.

In this embodiment, after determining the access location information of the first terminal device, the NEF network element may further send, to the UDM network element, the second information update request that includes the access location information of the first terminal device and the first indication. Therefore, after obtaining the first indication that indicates to update the subscription location information of the first terminal device based on the access location information of the first terminal device, the UDM network element may update, based on the first indication, the access location information of the first terminal device as the subscription location information to subscription information corresponding to the first terminal device, that is, the subscription location information is automatically updated.

In an optional implementation, the second information update request may further include information about the terminal device, to obtain the subscription location information of the first terminal device. The information about the terminal device includes at least one of an identifier of the first terminal device, an identifier of the second terminal device, a mailbox, and an account of social software.

Based on this, after receiving the second information update request, the UDM network element may update, based on the first indication of the update request and the geographical location information of the first terminal device, the subscription location information in the subscription information corresponding to the identifier of the first terminal device. For a specific update process, refer to the related descriptions of the implementations (1) and (2). Details are not described herein again.

Figure 10:
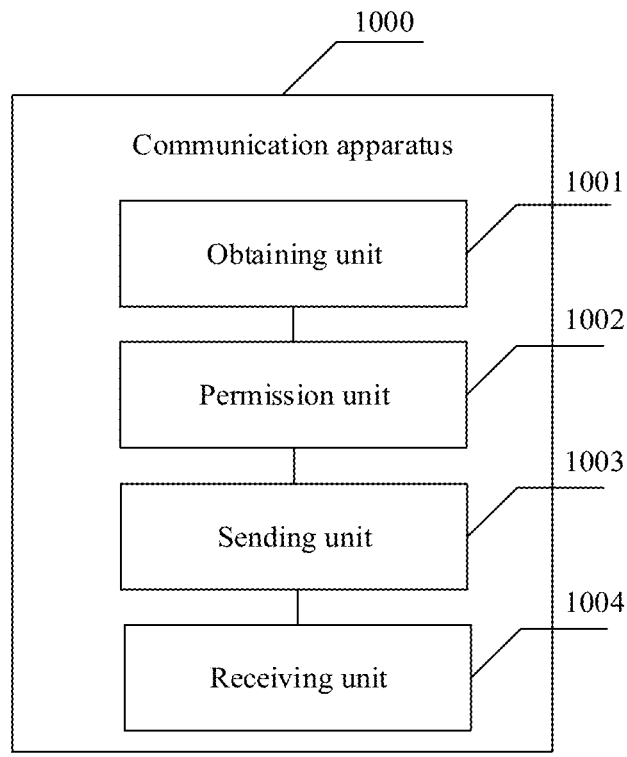
FIG. 10 is a block diagram of a structure of a communication apparatus according to an embodiment of this application.

To better implement the solutions of embodiments of this application, a related apparatus for implementing the solutions is further provided below. FIG. 10 shows a communication apparatus 1000 according to an embodiment of this application, used in a first network element. For example, the apparatus may be the first network element, or may be a chip or a chip system in the first network element. The apparatus 1000 may include an obtaining unit 1001, a permission unit 1002, a sending unit 1003, and a receiving unit 1004. The obtaining unit 1001 is configured to perform S401, S402, and S403 in the embodiment shown in FIG. 4. The permission unit 1002 is configured to perform S404 in the embodiment shown in FIG. 4. Details are as follows:

The obtaining unit 1001 is configured to: obtain an access request, where the access request includes access location information of a first terminal device; obtain subscription information of the first terminal device, where the subscription information includes subscription location information; and obtain permission information when confirming that the access location information of the first terminal device does not belong to the subscription location information, where the permission information is information for permitting the first terminal device to access a network at an access location corresponding to the access location information.

The permission unit 1002 is configured to permit, based on the permission information, the first terminal device to access the network at the access location corresponding to the access location information.

In an implementation of this embodiment, the access request further includes an identifier of the first terminal device; and that the obtaining unit 1001 is configured to obtain subscription information of the first terminal device includes: The obtaining unit 1001 is configured to obtain the subscription information of the first terminal device based on the identifier of the first terminal device.

In an implementation of this embodiment, the communication apparatus is an access management network element, the access management network element further includes a sending unit 1003 and a receiving unit 1004, and the sending unit 1003 is configured to send an information obtaining request to a UDM network element, where the information obtaining request includes the identifier of the first terminal device; and that the obtaining unit 1001 is configured to obtain subscription information of the first terminal device includes: The obtaining unit 1001 is configured to receive, through the receiving unit 1004, the subscription information sent by the UDM network element based on the identifier of the first terminal device.

In an implementation of this embodiment, the communication apparatus further includes a sending unit 1003 and a receiving unit 1004, and the sending unit 1003 is configured to send a confirmation request to an NEF network element, where the confirmation request includes the access location information of the first terminal device; and that the obtaining unit 1001 is configured to obtain permission information includes: The obtaining unit 1001 is configured to receive the permission information from the NEF network element through the receiving unit 1004.

In an implementation of this embodiment, the subscription information further includes information about the terminal device, and the confirmation request further carries the information about the terminal device.

In an implementation of this embodiment, the information about the terminal device includes one or more of the following: an identifier of a second terminal device, a mailbox, and an account name of social software.

In an implementation of this embodiment, the confirmation request further includes the subscription location information and/or the identifier of the first terminal device.

In an implementation of this embodiment, that the obtaining unit 1001 is configured to obtain permission information includes: The obtaining unit 1001 is configured to obtain a first parameter when the subscription information includes the first parameter, where the first parameter is used to indicate that the first terminal device is permitted to access the network at the access location corresponding to the access location information when the access location information of the first terminal device does not belong to the subscription location information.

In an implementation of this embodiment, the communication apparatus is an access management network element, the access management network element further includes a sending unit 1003 and a receiving unit 1004, and the sending unit 1003 is configured to send a confirmation request to a UDM network element, where the confirmation request includes the access location information of the first terminal device; and that the obtaining unit 1001 is configured to obtain permission information includes: The obtaining unit 1001 is configured to receive, through the receiving unit, the permission information sent by the UDM network element based on the access location information of the first terminal device.

In an implementation of this embodiment, the communication apparatus is an access management network element, the communication apparatus further includes a sending unit 1003 and a receiving unit 1004, and the sending unit 1003 is configured to send a confirmation request to an NEF network element, where the confirmation request includes the access location information of the first terminal device; and that the obtaining unit 1001 is configured to obtain permission information includes: The obtaining unit 1001 is configured to receive the permission information from a UDM network element through the receiving unit.

In an implementation of this embodiment, the communication apparatus is an access management network element, the apparatus further includes a sending unit 1003, and the sending unit 1003 is configured to send a subscription information update request to a UDM network element, where the subscription information update request includes the access location information of the first terminal device, and the subscription information update request is used to update the subscription location information based on the access location information of the first terminal device.

In an implementation of this embodiment, the communication apparatus is a UDM network element, and that the permission unit 1002 is configured to permit, based on the permission information, the first terminal device to access the network at the access location corresponding to the access location information includes: The permission unit 1002 is configured to update the subscription location information based on the access location information of the first terminal device.

In an implementation of this embodiment, the apparatus further includes a sending unit 1003, and the sending unit 1003 is configured to send an information update message to an access management network element, where the information update message includes the updated subscription location information.

In an implementation of this embodiment, that the obtaining unit 1001 is configured to obtain permission information includes: The obtaining unit 1001 is configured to obtain the permission information within a preset time period.

In an implementation of this embodiment, the access request includes indication information, and the indication information is used to indicate that the first network element obtains the permission information within the preset time period.

In an implementation of this embodiment, when the obtaining unit 1001 does not obtain the permission information within the preset time period, the apparatus further includes:

a sending unit 1003, configured to send timer information to the first terminal device, where the timer information is used to indicate that the first terminal device sends the access request after a timer expires.

In this embodiment of this application, the sending unit may implement a signal sending operation of the first network element in the foregoing method embodiment. The obtaining unit and the permission unit may be specifically processing units. The processing unit may implement a signal processing operation of the first network element in the foregoing method embodiment. In some implementations of this application, the communication apparatus may further include a receiving unit. The obtaining unit may obtain information through the receiving unit. The receiving unit may implement a signal receiving operation of the first network element in the foregoing method embodiment.

Figure 11:
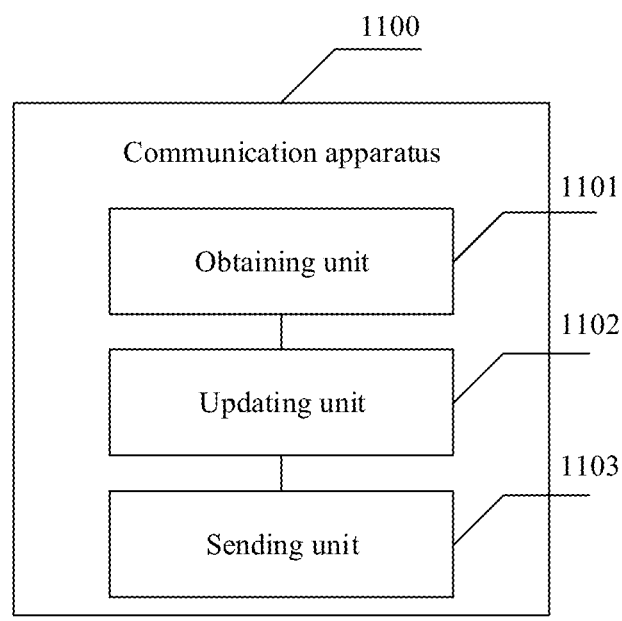
FIG. 11 is a block diagram of a structure of another communication apparatus according to an embodiment of this application.

To better implement the solutions of embodiments of this application, a related apparatus for implementing the solutions is further provided below. FIG. 11 shows a communication apparatus 1100 according to an embodiment of this application, used in a UDM network element. The apparatus 1100 may include an obtaining unit 1101, an updating unit 1102, and a sending unit 1103. The obtaining unit 1101 is configured to perform S801 and S802 in the embodiment shown in FIG. 8. The updating unit 1102 is configured to perform S803 in the embodiment shown in FIG. 8. Details are as follows:

The obtaining unit 1101 is configured to: obtain access location information of a first terminal device and a first indication, where the first indication is used to indicate to update subscription location information of the first terminal device based on the access location information of the first terminal device; and obtain subscription information of the first terminal device, where the subscription information includes the subscription location information of the first terminal device.

The updating unit 1102 is configured to update the subscription location information of the first terminal device based on the access location information of the first terminal device and the first indication.

In an implementation of this embodiment, that the obtaining unit 1101 is configured to obtain access location information of a first terminal device includes: The obtaining unit 1101 is configured to: obtain geographical location information of the first terminal device; and determine the access location information of the first terminal device based on the geographical location information of the first terminal device.

In an implementation of this embodiment, that the obtaining unit 1101 is configured to obtain subscription information of the first terminal device includes: The obtaining unit 1101 is configured to: obtain information about the terminal device; and obtain the subscription information of the first terminal device based on the information about the terminal device.

In an implementation of this embodiment, the information about the terminal device includes at least one of the following: an identifier of the first terminal device, an identifier of a second terminal device, a mailbox, and an account of social software.

In an implementation of this embodiment, the apparatus further includes a sending unit 1103, configured to send an update success message to the first terminal device.

In this embodiment of this application, the sending unit may implement a signal sending operation of the UDM network element in the foregoing method embodiment. The obtaining unit and the updating unit may be specifically processing units. The processing unit may implement a signal processing operation of the UDM network element in the foregoing method embodiment. In some implementations of this application, the communication apparatus may further include a receiving unit. The obtaining unit may obtain information through the receiving unit. The receiving unit may implement a signal receiving operation of the UDM network element in the foregoing method embodiment.

Figure 12:
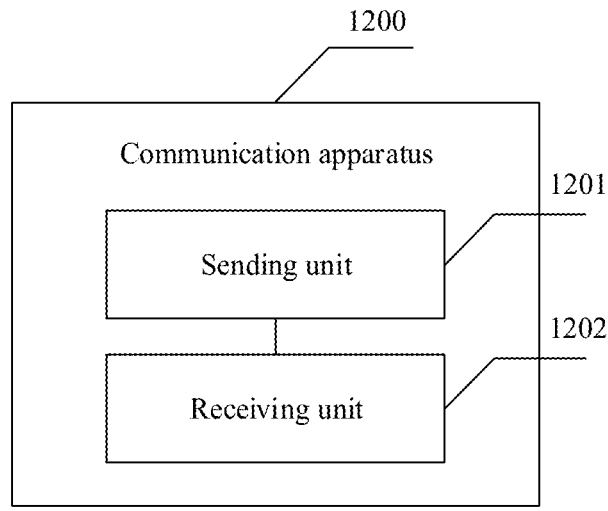
FIG. 12 is a block diagram of a structure of still another communication apparatus according to an embodiment of this application.

To better implement the solutions of embodiments of this application, a related apparatus for implementing the solutions is further provided below. FIG. 12 shows a communication apparatus 1200 according to an embodiment of this application, used in a second terminal device. The apparatus 1200 may include a sending unit 1201. The sending unit 1201 is configured to perform a step of sending a first information update request to an NEF network element. Details are as follows:

The sending unit 1201 is configured to send the first information update request to the NEF network element, where the first information update request includes geographical location information of a first terminal device and a first indication, and the first indication is used to indicate to update subscription location information of the first terminal device based on the geographical location information of the first terminal device.

In an implementation of this embodiment, the first information update request further includes information about the terminal device, and the information about the terminal device is used to obtain the subscription location information of the first terminal device.

In an implementation of this embodiment, the information about the terminal device includes at least one of the following: an identifier of the first terminal device, an identifier of the second terminal device, a mailbox, and an account of social software.

In an implementation of this embodiment, the apparatus further includes: a receiving unit 1202, configured to receive an update success message.

In an implementation of this embodiment, the first information update request is sent in one or more of the following manners: an SMS message, an email, and social software.

In this embodiment of this application, the sending unit may implement a signal sending operation of the terminal device in the foregoing method embodiment. The processing unit may implement a signal processing operation of the terminal device in the foregoing method embodiment. The receiving unit may implement a signal receiving operation of the terminal device in the foregoing method embodiment.

Figure 13:
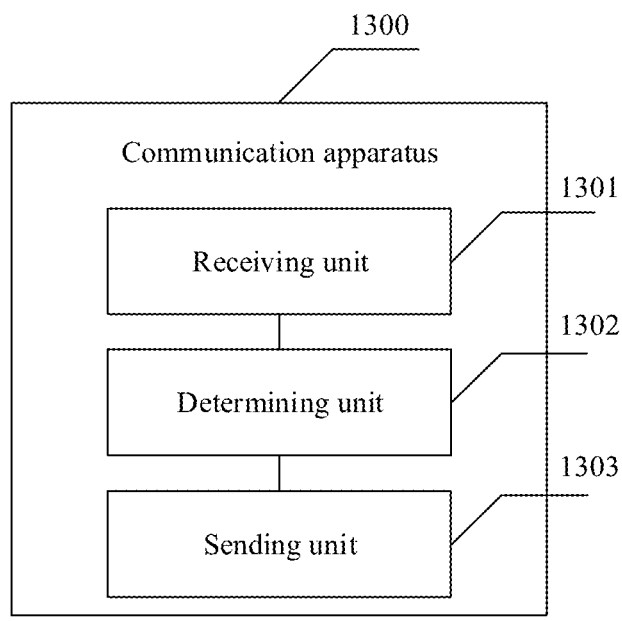
FIG. 13 is a block diagram of a structure of yet another communication apparatus according to an embodiment of this application.

To better implement the solutions of embodiments of this application, a related apparatus for implementing the solutions is further provided below. FIG. 13 shows a communication apparatus 1300 according to an embodiment of this application, used in an NEF network element. The apparatus 1300 may include a receiving unit 1301, a determining unit 1302, and a sending unit 1303. The receiving unit 1301 is configured to perform S901 in the embodiment shown in FIG. 9. The determining unit 1302 is configured to perform S902 in the embodiment shown in FIG. 9. The sending unit 1303 is configured to perform S903 in the embodiment shown in FIG. 9. Details are as follows:

The receiving unit 1301 is configured to receive a first information update request, where the first information update request includes geographical location information of a first terminal device and a first indication, and the first indication is used to indicate to update subscription location information of the first terminal device based on the geographical location information of the first terminal device.

The determining unit 1302 is configured to determine access location information of the first terminal device based on the geographical location information of the first terminal device.

The sending unit 1303 is configured to send a second information update request to a UDM network element, where the second information update request includes the access location information of the first terminal device and the first indication.

In an implementation of this embodiment, the second information update request further includes information about the terminal device, and the information about the terminal device is used to obtain the subscription location information of the first terminal device.

In an implementation of this embodiment, the information about the terminal device includes at least one of the following: an identifier of the first terminal device, an identifier of a second terminal device, a mailbox, and an account of social software.

In this embodiment of this application, the sending unit may implement a signal sending operation of the NEF network element in the foregoing method embodiment. The determining unit may be specifically a processing unit. The processing unit may implement a signal processing operation of the NEF network element in the foregoing method embodiment. The receiving unit may implement a signal receiving operation of the NEF network element in the foregoing method embodiment.

Figure 14:
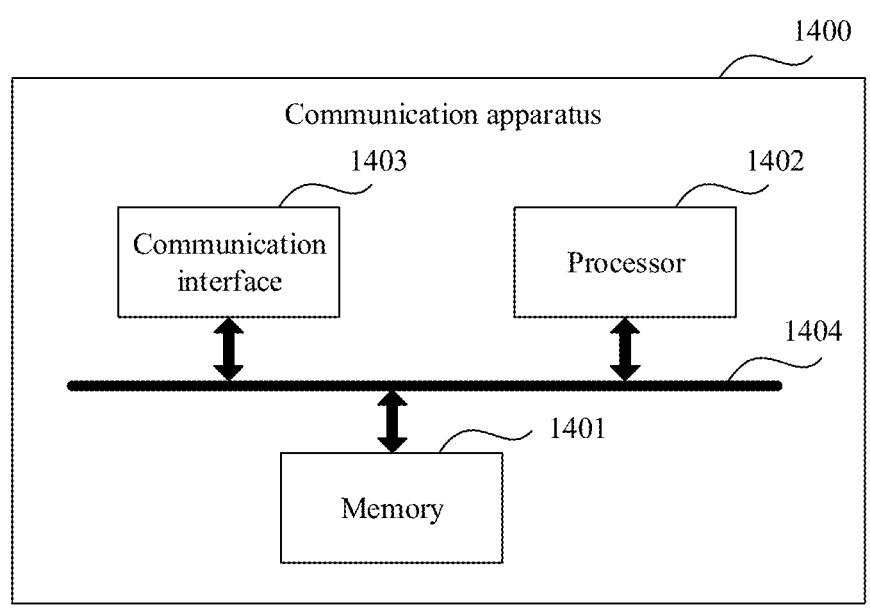
FIG. 14 is a schematic diagram of a structure of a communication apparatus according to an embodiment of this application.

FIG. 14 shows a communication apparatus 1400 according to an embodiment of this application. The device includes a memory 1401, at least one processor 1402, and a communication interface 1403.

The memory 1401 is configured to store instructions.

Figure 4:
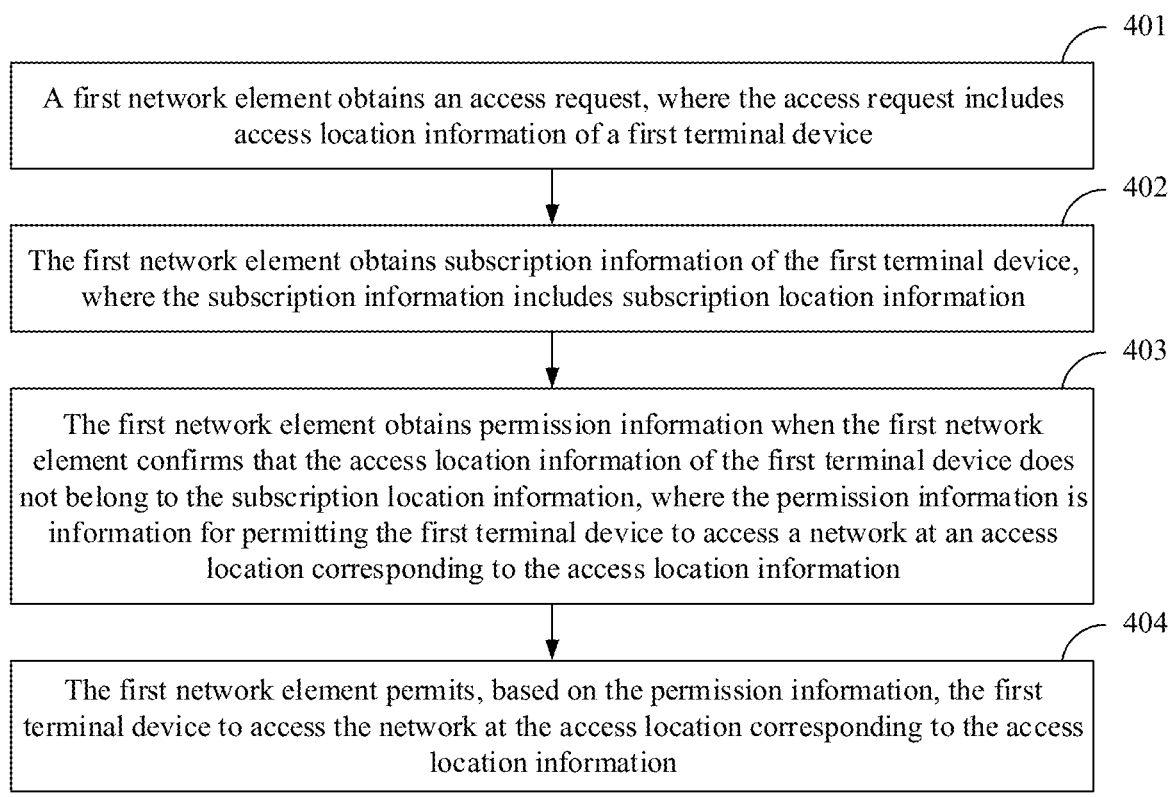
FIG. 4 is a flowchart of a network access method according to an embodiment of this application.

The processor 1402 is configured to execute the instructions in the memory 1401, to perform the network access method applied to the embodiment shown in FIG. 4.

The communication interface 1403 is configured to perform communication.

The memory 1401, the processor 1402, and the communication interface 1403 are connected to each other through a bus 1404. The bus 1404 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 14, but this does not mean that there is only one bus or only one type of bus.

In a specific embodiment, the processor 1402 is configured to perform a function of the first network element in the foregoing method. Specifically, when performing network access, the processor 1402 first obtains an access request that includes access location information of a first terminal device. Then, the processor 1402 obtains subscription information that includes subscription location information of the first terminal device. Next, when confirming that the access location information of the first terminal device does not belong to the subscription location information, the processor 1402 may obtain permission information for permitting the first terminal device to access a network at an access location corresponding to the access location information. Further, the processor 1402 may permit, based on the permission message, the first terminal device to access the network at the access location corresponding to the access location information. For a detailed processing process of the processor 1402, refer to detailed descriptions of S401, S402, S403, and S404 in the embodiment shown in FIG. 4. Details are not described herein again.

Alternatively, the processor 1402 is configured to perform a function of the UDM network element in the foregoing method. Specifically, when updating subscription location information, the processor 1402 first obtains access location information of a first terminal device and a first indication. Then, after obtaining subscription information that includes the subscription location information of the first terminal device, the processor 1402 may update the subscription location information of the first terminal device based on the obtained access location information of the first terminal device and the obtained first indication. For a detailed processing process of the processor 1402, refer to detailed descriptions of S801, S802, and S803 in the embodiment shown in FIG. 8. Details are not described herein again.

Alternatively, the processor 1402 is configured to perform a function of the second terminal device in the foregoing method. Specifically, when updating subscription location information, the processor 1402 sends a first information update request to an NEF network element, where the first information update request includes geographical location information of a first terminal device and a first indication, and the first indication is used to indicate to update the subscription location information of the first terminal device based on the geographical location information of the first terminal device. For a detailed processing process of the processor 1402, refer to detailed descriptions of the foregoing method embodiment applied to the second terminal device. Details are not described herein again.

Alternatively, the processor 1402 is configured to perform a function of the NEF network element in the foregoing method. Specifically, when updating subscription location information, the processor 1402 first receives a first information update request that includes geographical location information of a first terminal device and a first indication, where the first indication is used to indicate to update the subscription location information of the first terminal device based on the geographical location information of the first terminal device. Then, the processor 1402 determines access location information of the first terminal device based on the geographical location information of the first terminal device. Next, the processor 1402 sends, to a UDM network element, a second information update request that includes the access location information of the first terminal device and the first indication, to indicate the UDM network element to update the subscription location information of the first terminal device based on the geographical location information of the first terminal device. For a detailed processing process of the processor 1402, refer to detailed descriptions of S901, S902, and S903 in the embodiment shown in FIG. 9. Details are not described herein again.

The memory 1401 may be a random access memory (RAM), a flash memory, a read-only memory (ROM), an erasable programmable read-only memory (EPROM), an electrically erasable programmable read-only memory (EEPROM), a register, a hard disk, a removable hard disk, a CD-ROM, or any other form of storage medium known to persons skilled in the art.

The processor 1402 may be, for example, a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this application. Alternatively, the processor may be a combination for implementing a computing function, for example, a combination of one or more microprocessors, or a combination of the DSP and a microprocessor.

The communication interface 1403 may be, for example, an interface card, or may be an ethernet interface or an asynchronous transfer mode (ATM) interface.

An embodiment of this application further provides a computer-readable storage medium. The computer-readable storage medium includes instructions. When the instructions are run on a computer, the computer is enabled to perform the foregoing network access method.

An embodiment of this application further provides a chip or a chip system. The chip or the chip system includes at least one processor and a communication interface. The communication interface and the at least one processor are interconnected through a line. The at least one processor is configured to run a computer program or instructions, to perform the method performed by the first network element, the UDM network element, the second terminal device, or the NEF network element in the foregoing embodiments.

The communication interface in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

In this embodiment of this application, the receiving unit and the sending unit may be communication interfaces, or may be corresponding transceiver circuits, transceivers, or transceiver chips. The processing unit may be a processor. In a possible implementation, an operation of the processing unit may be performed by the at least one processor.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in appropriate circumstances, so that embodiments described herein can be implemented in other orders than the content illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit. Alternatively, each of the units may exist alone physically, or two or more units are integrated into one unit. The integrated unit may be implemented in a form of hardware, or may be implemented in a form of a software module unit.

When the integrated unit is implemented in the form of the software module unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device, or the like) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

Persons skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communication medium, and the communication medium includes any medium that enables a computer program to be transmitted from one place to another. The storage medium may be any available medium accessible to a general purpose or dedicated computer.

In the foregoing specific implementations, the objectives, technical solutions, and beneficial effects of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

In addition, embodiments of this application are also applicable to another future-oriented communication technology. Network architectures and service scenarios described in this application are intended to describe the technical solutions in this application more clearly, and do not constitute a limitation on the technical solutions provided in this application. Persons of ordinary skill in the art may know that: With evolution of network architectures and emergence of new service scenarios, the technical solutions provided in this application are also applicable to similar technical problems.

What is claimed is:

1. A network access method, comprising:
obtaining, by a first network element, an access request, wherein the access request comprises access location information of a first terminal device;
obtaining, by the first network element, subscription information of the first terminal device, wherein the subscription information comprises subscription location information;
obtaining, by the first network element, permission information in response to the first network element confirming that the access location information of the first terminal device does not belong to the subscription location information, wherein the permission information is information for permitting the first terminal device to access a network at an access location corresponding to the access location information; and
permitting, by the first network element based on the permission information, the first terminal device to access the network at the access location corresponding to the access location information;
wherein in response to the first network element not obtaining the permission information within a preset time period, the method further comprises:
sending, by the first network element, timer information to the first terminal device, wherein the timer information is used to indicate that the first terminal device sends the access request after a timer associated with the timer information expires.

2. The method according to claim 1, wherein the access request further comprises an identifier of the first terminal device, and the obtaining, by the first network element, the subscription information of the first terminal device comprises:
obtaining, by the first network element, the subscription information of the first terminal device based on the identifier of the first terminal device.

3. The method according to claim 2, wherein the first network element is an access management network element, and the obtaining, by the first network element, the subscription information of the first terminal device comprises:
sending, by the access management network element, an information obtaining request to a unified data management (UDM) network element, wherein the information obtaining request comprises the identifier of the first terminal device; and
receiving, by the access management network element, the subscription information from the UDM network element based on the identifier of the first terminal device.

4. The method according to claim 1, wherein the obtaining, by the first network element, the permission information comprises:
sending, by the first network element, a confirmation request to a network exposure function (NEF) network element, wherein the confirmation request comprises the access location information of the first terminal device; and
receiving, by the first network element, the permission information from the NEF network element based on the access location information of the first terminal device.

5. The method according to claim 4, wherein the subscription information further comprises information about the first terminal device, and the confirmation request further carries the information about the first terminal device.

6. The method according to claim 4, wherein the confirmation request further comprises one or more of the subscription location information or the identifier of the first terminal device.

7. The method according to claim 1, wherein the obtaining, by the first network element, the permission information comprises:
obtaining, by the first network element, a first parameter in response to the subscription information comprising the first parameter, wherein the first parameter is used to indicate that the first terminal device is permitted to access the network at the access location corresponding to the access location information in response to the access location information of the first terminal device not belonging to the subscription location information.

8. The method according to claim 1, wherein the first network element is an access management network element, and the obtaining, by the first network element, the permission information comprises:
sending, by the access management network element, a confirmation request to a unified data management (UDM) network element, wherein the confirmation request comprises the access location information of the first terminal device; and
receiving, by the access management network element, the permission information from the UDM network element based on the access location information of the first terminal device.

9. The method according to claim 1, wherein the first network element is an access management network element, and the obtaining, by the first network element, the permission information comprises:
sending, by the access management network element, a confirmation request to a network exposure function (NEF) network element, wherein the confirmation request comprises the access location information of the first terminal device; and
receiving, by the access management network element, the permission information from a unified data management (UDM) network element.

10. The method according to claim 1, wherein the first network element is an access management network element, and after the obtaining, by the first network element, the permission information, the method further comprises:

sending, by the access management network element, a subscription information update request to a unified data management (UDM) network element, wherein the subscription information update request comprises the access location information of the first terminal device, and wherein the subscription information update request is used to update the subscription location information based on the access location information of the first terminal device.

11. The method according to claim 1, wherein the first network element is a unified data management (UDM) network element, and the permitting, by the first network element based on the permission information, the first terminal device to access the network at the access location corresponding to the access location information comprises:
updating, by the UDM network element, the subscription location information to updated subscription location information based on the access location information of the first terminal device.

12. The method according to claim 11, further comprising:
sending, by the UDM network element, an information update message to an access management network element, wherein the information update message comprises the updated subscription location information.

13. The method according to claim 1, wherein the obtaining, by the first network element, the permission information comprises:
obtaining, by the first network element, the permission information within a preset time period.

14. The method according to claim 13, wherein the access request comprises indication information, and the indication information is used to indicate that the first network element obtains the permission information within the preset time period.

15. A communication apparatus, comprising:
a memory storing instructions; and
a processor configured to execute the instructions to cause the communication apparatus to:
obtain an access request, wherein the access request comprises access location information of a first terminal device;
obtain subscription information of the first terminal device, wherein the subscription information comprises subscription location information;
obtain permission information in response to confirming that the access location information of the first terminal device does not belong to the subscription location information, wherein the permission information is information for permitting the first terminal device to access a network at an access location corresponding to the access location information; and
permit, based on the permission information, the first terminal device to access the network at the access location corresponding to the access location information;
wherein in response to the first network element not obtaining the permission information within a preset time period, the processor is further configured to execute the instructions to cause the communication apparatus to:
send timer information to the first terminal device, wherein the timer information is used to indicate that the first terminal device sends the access request after a timer associated with the timer information expires.

16. The communication apparatus according to claim 15, wherein the communication apparatus is an access management network element, wherein the access management network element further comprises a transceiver configured to send an information obtaining request to a unified data management (UDM) network element, wherein the information obtaining request comprises the identifier of the first terminal device; and
wherein obtaining the subscription information of the first terminal device comprises receiving, through the transceiver, the subscription information from the UDM network element based on the identifier of the first terminal device.

17. The communication apparatus according to claim 15, wherein the communication apparatus further comprises a transceiver configured to send a confirmation request to a network exposure function (NEF) network element, wherein the confirmation request comprises the access location information of the first terminal device; and
wherein obtaining the permission information comprises receiving the permission information from the NEF network element through the transceiver.

18. A non-transitory computer-readable storage medium storing instructions that, when run on a computer, cause the computer to perform a method comprising:
obtaining an access request, wherein the access request comprises access location information of a first terminal device;
obtaining subscription information of the first terminal device, wherein the subscription information comprises subscription location information;
obtaining permission information in response to the first network element confirming that the access location information of the first terminal device does not belong to the subscription location information, wherein the permission information is information for permitting the first terminal device to access a network at an access location corresponding to the access location information; and
permitting, based on the permission information, the first terminal device to access the network at the access location corresponding to the access location information;
wherein in response to the first network element not obtaining the permission information within a preset time period, the method further comprises:
sending timer information to the first terminal device, wherein the timer information is used to indicate that the first terminal device sends the access request after a timer associated with the timer information expires.

* * * * *